United States Patent [19]

Nagasaka

[11] Patent Number: 5,333,246
[45] Date of Patent: Jul. 26, 1994

[54] PAGE-DESCRIPTION LANGUAGE INTERPRETER FOR A PARALLEL-PROCESSING SYSTEM

[75] Inventor: Fumio Nagasaka, Suwa, Japan

[73] Assignee: Seiko Epson Corporation, Tokyo, Japan

[21] Appl. No.: 777,386

[22] PCT Filed: Apr. 5, 1991

[86] PCT No.: PCT/JP91/00456
§ 371 Date: Dec. 4, 1991
§ 102(e) Date: Dec. 4, 1991

[87] PCT Pub. No.: WO91/15831
PCT Pub. Date: Oct. 17, 1991

[30] Foreign Application Priority Data
Apr. 5, 1990 [JP] Japan .................. 2-90728

[51] Int. Cl.⁵ .................................. G06F 15/62
[52] U.S. Cl. .................. 395/133; 395/163; 395/145; 395/147
[58] Field of Search ............. 395/162–166, 395/161, 155, 153, 144–149, 133–139

[56] References Cited

U.S. PATENT DOCUMENTS

4,945,500  7/1990  Deering ................. 395/163 X
4,951,280  8/1990  McCool et al. ......... 340/825.05 X

*Primary Examiner*—Heather R. Herndon
*Assistant Examiner*—Almis Jankus
*Attorney, Agent, or Firm*—Ladas & Parry

[57] ABSTRACT

The rasterize processing for obtaining printing picture element information from a source file described in a page-description language is distributed-processed by a plurality of information processing units (6a, 6b, 6c) loose connected via a network (7). In the information processing unit (6a) which generates a printing request, a client process (210) converts a source file (19) into an intermediate code file (10) and further divides the intermediate code file into a plurality of partial files executable in the rasterize processing, independently. A part of these plural partial files is given to a rasterizer (212) of the information processing unit (6a) which generates a printing request, so as to be rasterized into picture element information. The remaining part of the plural partial files are distributed to the other information processing units (6b, 6c) via the network. In each of these other information processing units (6b, 6c), the distributed partial file is received by a server process (211), transmitted to the rasterizer (212) to form partial picture element information. These partial picture element information formed by these other information processing units (6b, 6c) are returned to the information processing unit (6a) which generates the printing request. In this information processing unit (6a) which generates the printing request, the client process (210) combines the picture element information returned from the other information processing units (6b, 6c) with the picture element information formed by the rasterizer (212) of its own unit, to form the entire picture element information. The entire picture element information is transmitted to a printing unit (21).

10 Claims, 32 Drawing Sheets

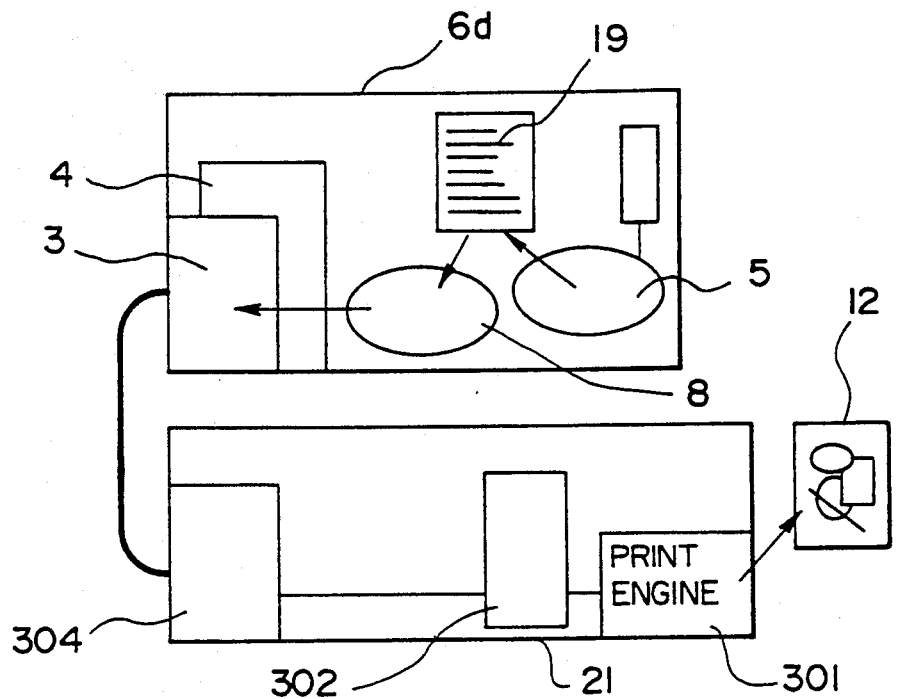
FIG. IA
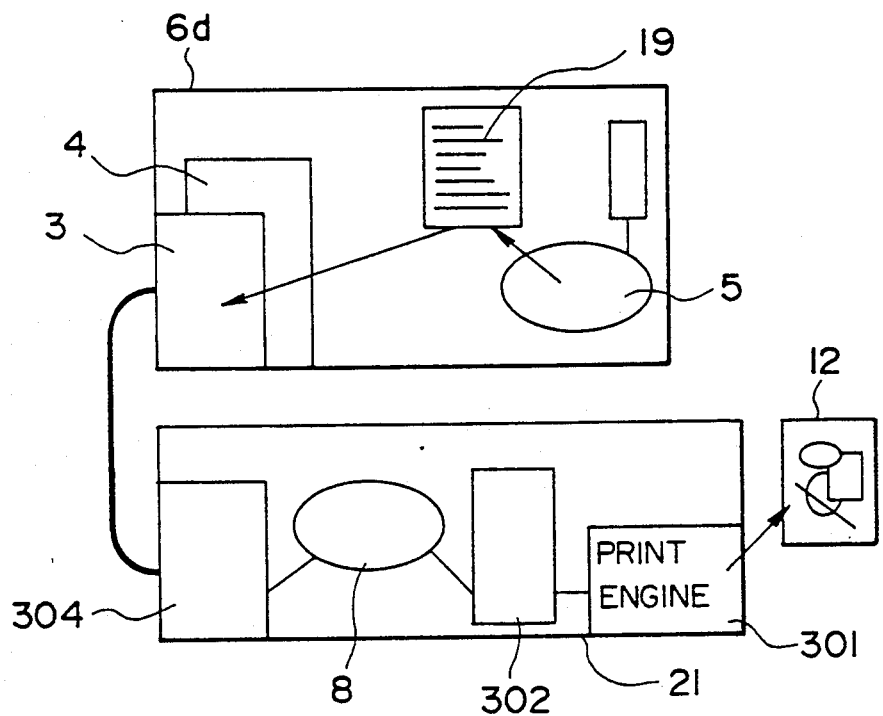
FIG. IB

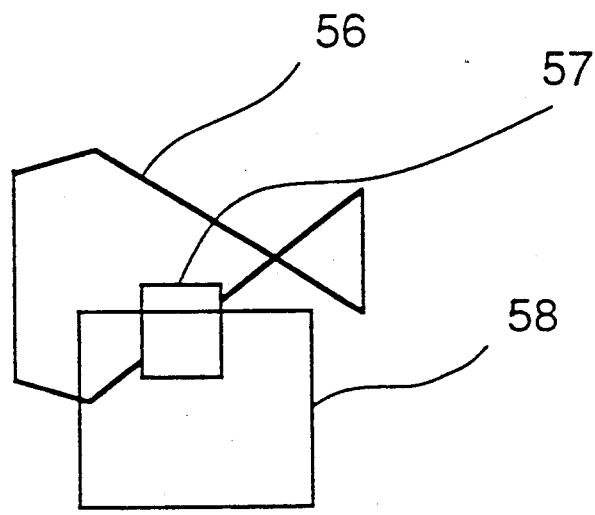
F I G. 16
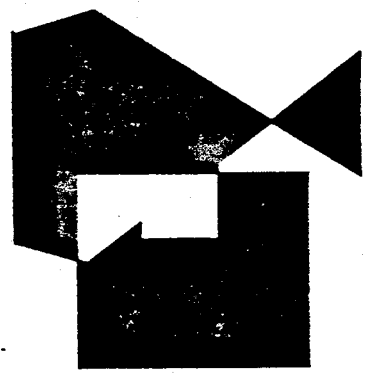
F I G. 17
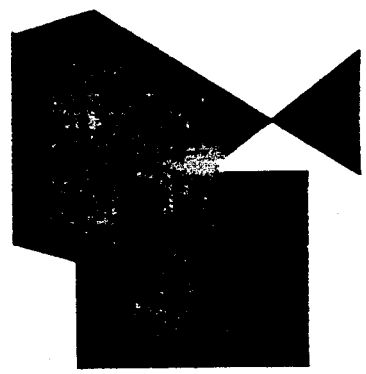
F I G. 18

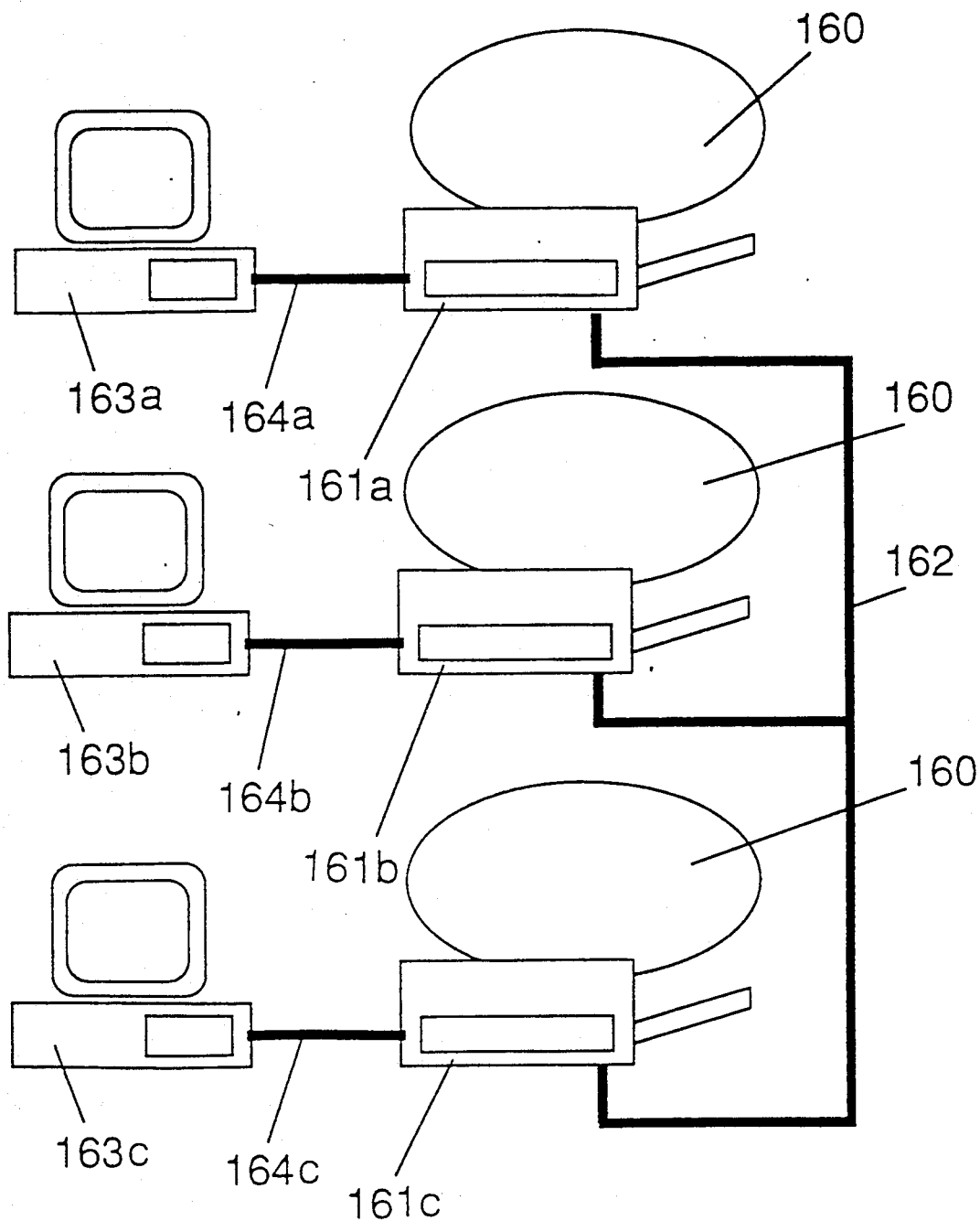
F I G. 36

PAGE-DESCRIPTION LANGUAGE INTERPRETER FOR A PARALLEL-PROCESSING SYSTEM

TECHNICAL FIELD

The present invention relates to a translating processing of description language programs describing printing control for a printing unit used as one of computer peripheral units, and more specifically to an interpreter for executing the translating processing of a descriptive language (referred to as "page-description language" in general and therefore hereinafter) developed to describe printing control procedure, characters, graphic forms, image information, etc. and to generalize the conversion of these characters, graphic forms and image information into printing picture elements and the printing operation thereof, which can be applied to a system in which a plurality of information processing units are connected in a network fashion.

BACKGROUND ART

With the advance of the development of printing units suitable for high speed digital printing such as electrophotographic technique, ink jet technique, etc., there has been widely used the single page unit printing procedure control method such that images, graphic forms and characters can be handled in the same way and further characters and graphic forms can be freely enlarged, rotated or transformed, being different from the prior-art method of printing mainly characters. Since the control method as described above has been realized, it is general to develop program languages for describing control procedure, to mount a language translating processing system (so-called interpreter) on a printing unit or a computer, and to convert the language into printing picture elements through the interpreter.

In a single computer, a printing request generated by an application program calls the function of an operating system to actuate a printing unit. Under these conditions, "the page description language" is used to execute the printing procedure, without depending upon hardware such as the resolution, printing method, and the number of printing head dots of the printing unit.

An example of prior-art systems will be described hereinbelow with reference to FIGS. 1A and 1B. Source codes 19 of the page-description language generated by an application program within a computer 6d are translated by a page-description language interpreter 8 to convert the source codes into picture elements used for actual printing. This operation as to whether the page-description language interpreter 8 is executed within the computer 6d as shown in FIG. 1A or within a printing unit 21 as shown in FIG. 1B is different according to the system. In any cases, however, the page-description language interpreter is realized by a single processor in the prior-art system.

Further, there exists a system referred to as print server as one of prior-art systems related to the present invention. In this system, another computer (not shown) is connected to the computer 6d as shown in FIG. 1A, for instance in a network fashion, and the page-description language is rasterized by another computer, instead of the computer 6d which generates a printing processing request. In this prior-art system, the interpreter is realized by a single processor of another computer.

A large capacity of memory is required for conversion of the page-description language into printing picture elements, when executed by the interpreter. Further, where the interpreter is realized by only software, there exists a serious problem in that the processing time is long. In addition, it is apparent that color page printers are expected to be used widely in the near future and high density printing will be required more and more in the case of black-and-white printing. In both the cases, a huge memory space is inevitably necessary. In the case of the color printing, since the printing control procedure is further complicated and therefore the procedure items required for the translation processing program system increase, a long processing time may be required for the execution of the color printing.

To solve the above-mentioned problems, the object of the present invention is to realize a high-speed and high-density processing, which can reduce the contents to be processed by a single processor in accordance with distributed processing such that the respective procedures of the interpreter can be executed by a plurality of processors, to provide such an effect that a huge memory space can be secured as a whole by allowing the plural processors to utilize the respective memory spaces of the respective processors.

DISCLOSURE OF THE INVENTION

The present invention provides a page-description language interpreter for executing rasterize processing such that picture element information for printing can be obtained by a source file described in a page-description language, comprising:

a plurality of information processing units loose connected via a network;

dividing means for receiving the source file and dividing the received source file or an intermediate code file converted from the source file into a plurality of partial files executable in the rasterize processing, independently;

distributing means for distributing the partial files to said plural information processing units via the network, to distributed-process the rasterize processing by the plural information processing units;

means provided for said plural information processing units respectively, for obtaining partial picture element information by rasterizing the distributed partial file; and means for collecting the partial picture element information obtained by said plural information processing units via the network and forming entire picture element information by combining the collected partial picture element information.

BRIEF DESCRIPTION OF THE DRAWINGS

FIGS. 1A and 1B are block diagrams showing prior-art PDL interpreter configurations;

FIG. 16 is an illustration for assistance in explaining the discrimination of graphic form groups;

FIGS. 17 and 18 are illustrations for assistance in explaining the filling algorithms;

FIG. 36 is a schematic block diagram showing the fifth embodiment configuration according to the present invention;

PREFERRED EMBODIMENTS OF THE INVENTION

In recent computer systems, it has become usual that a plurality of personal computers and engineering work stations are connected for use into a network. The present invention can be executed under these environments, when an application program being executed by one of computers connected on the network generates a request of printing processing to the operating system. The printing request generated by any one of the computers calls the function of the operating system to actuate a printing unit. Under these conditions, "the page-description language" is used to execute the printing procedure without depending upon hardware such as the resolution, printing method, the number of printing head dots of the printing unit. In other words, since the application program does not know the hardware contents of the printing units used in the network system, a source file written in a page-description language is given to a translating program. In the present invention, the translating program divides the source file into small files that can be handled independently and converts the small files into printing picture elements by sharing the respective small file processing with other processors now usable on the network under control of the operating system.

Several preferred embodiments of the present invention will be described hereinbelow.

Figure 2:
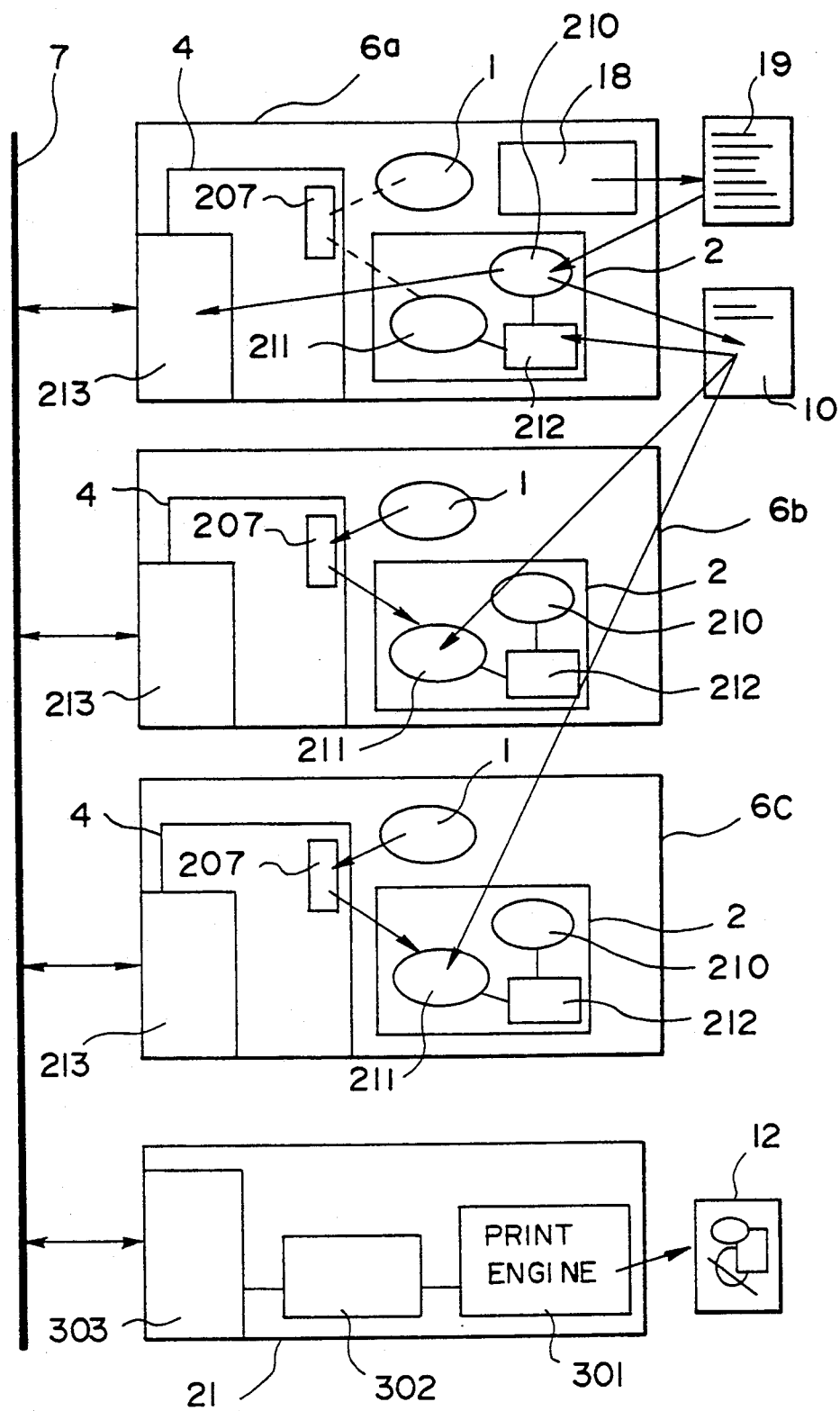
FIG. 2 is a block diagram showing a first embodiment configuration of the PDL interpreter according to the present invention.
Figure 3:
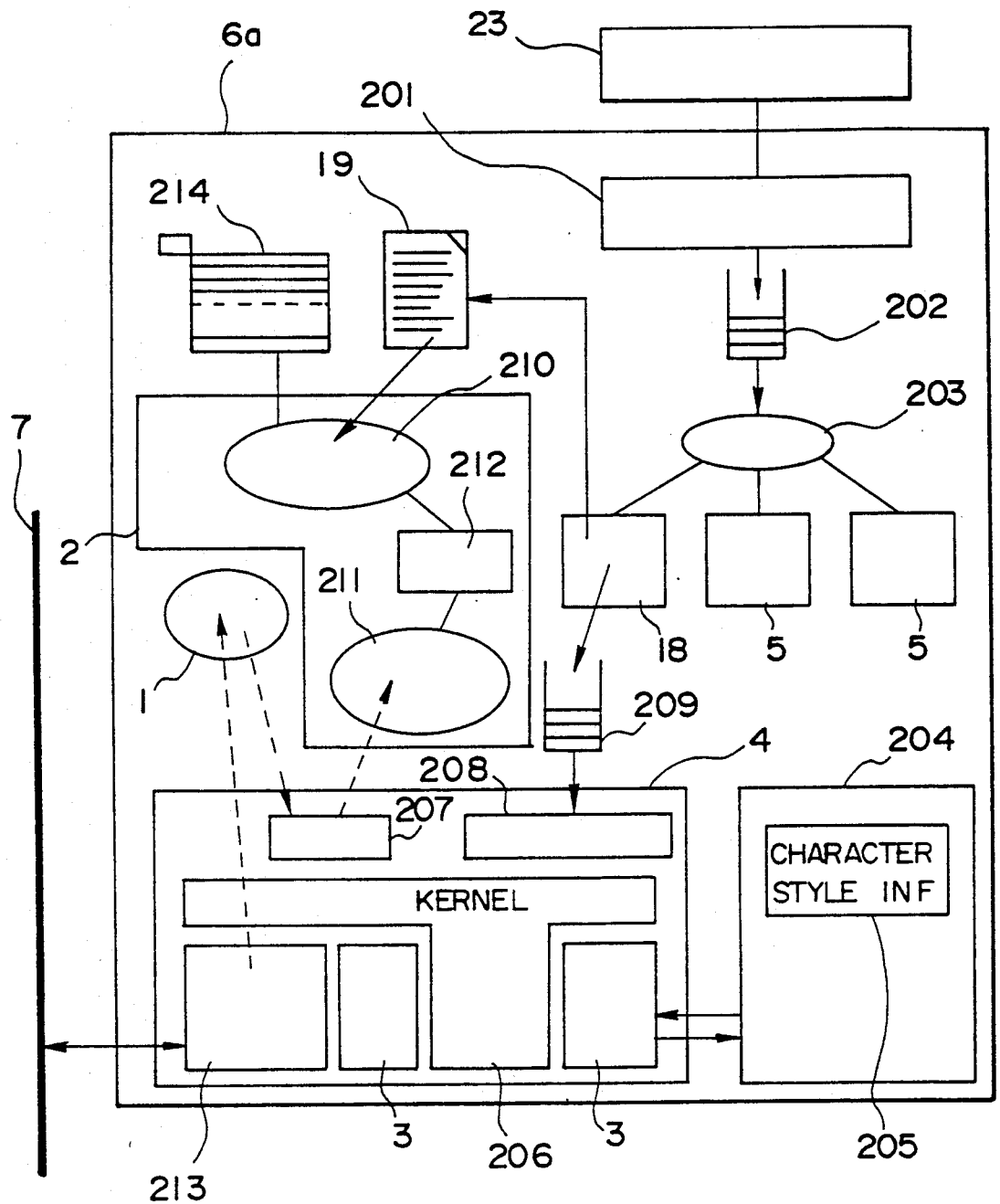
FIG. 3 is a block diagram showing a computer configuration of the embodiment shown in FIG. 2.

FIG. 2 shows a first embodiment of the page-description language parallel-processing interpreter according to the present invention. This embodiment is composed of a plurality of computers 6a to 6c and at least one printer 21. FIG. 3 shows the functions of one 6a of these computers. The other computers 6b and 6c are also provided with the same functions.

In this embodiment, the general hardware configuration for operating the page-description language parallel-processing printer of the present invention is as follows:

(a) In addition to a computer (referred to as "computer A", hereinafter) for generating a printing request, at least one information processing unit (e.g. another computer or printer) is connected to the computer A via some communicating means.

(b) The computer A and the information processing unit connected to the computer A can execute the page-description language interpreter on the basis of the distributed processing.

(c) The computer A and the information processing unit can execute at least two processes.

Here, an execution unit of a program which consumes memory and processor resources required for execution under control of the operating system, is referred to as "process". The process is controlled by the memory allocation and the process header. In this process header, a process identifier (process ID), a current program counter, a stack pointer, values held by another CPU register, and a memory status are recorded. The process that has lower priority in execution order is swappd out to an auxiliary memory (not in the main memory) by the operating system. Further, it is also possible to construct a single unit program by a plurality of processes. Further, communicating means between the computer A for generating a printing request and other information processing units, or hardware for realizing the communicating means is referred to as "network", hereinafter. The network is provided with a physical address control mechanism dependent upon the hardware, and a logical address control mechanism referred to by the upper structured programs. Although being used for packet transfer to a specific computer connected to the network, these addresses are provided with more abstract higher order processing procedure in many network protocols. In the embodiments of the present invention, the operation will be explained under the condition that a group of these higher order processing routines are supplied by the operating system. Owing to the control mechanism as described above, the assumption is made that the program can detect a computer on the basis of its name (i.e. identifier) and logical address and further can execute packet transmission/reception to/from the communicating process by use of a communication socket or a similar mechanism.

With reference to FIG. 3, the computer 6a of this embodiment will be described hereinbelow. The configuration of the other computers 6b and 6c is the same as that of the computer 6a.

This computer 6a constructs a part of the page-description language translation processing system. Here, "page-description language" implies a language used to describe the control procedure such as printed data arrangement and form, character information, etc. of printing units of dot-matrix type, electrophotography type, etc. The language grammar is generally determined by specifications peculiar to each language. However, these grammars are only a promised decision. The present invention provides a processing method of translating a document described on the basis of a specific page-description language and further converting the translated document into actually printed data. Therefore, the language specifications are not described hereinbelow. Further, "page-description language" is referred to as PDL simply, hereinafter.

In FIG. 3, the translation processing system of the present invention includes two sections 1 and 2. The section 1 is a resident program and the section 2 is a PDL parallel processing interpreter for executing printing data forming processing. In this embodiment, a printing unit 21 (shown in FIG. 2) performs only the so-called bit image printing such that the printing and nonprinting of each of picture elements are determined on the basis of 0/1 of one bit included in a data string. On the other hand, the PDL parallel processing interpreter 2 inputs the page-description language source codes and outputs a data string for bit image printing and printer control codes.

The PDL parallel processing interpreter 2 of the present invention includes three processes 210, 211 and 212. The process 210 is a client process for PDL translation, which uses the rasterize process 212. The process 211 is a server process formed by the resident processing program 1. The process formation is effected by a process forming mechanism 207 of an operating system 4.

The operating system 4 allocates CPU times to a plurality of processes by a scheduler 208. Therefore, the computer 6a can realize the so-called multitask processing by which a plurality of processes can be executed simultaneously. The scheduler 208 can be realized by the priority control and the queue control processing of a kernel 206 of the operating system 4. Further, in the operating system 4, a device driver 3 such as hard disk device driver, clock driver, etc. is used. The resident program 1 and the PDL parallel processing interpreter 2 use a network device driver 213 to effect communications of data strings with the other computers 6b and 6c and the printing unit 21. Further, there is character style (font) data 205 as another source used for the printing processing. The character style data 205 is recorded in an auxiliary memory unit 204 in the form of outline font data or bit map font data.

The computer 6a can execute a plurality of application programs 5 and 18 simultaneously. The computer user operates the application programs 5 and 18 by use of an input device 23 such as mouse, keyboard, etc. A user interface process 201 detects user's operation and enqueues user's events to the user's event queue 202. In general, the application executed in the foreground is a program (e.g. application program 18) for obtaining the current event from the invent processing process 203. A printing request executed by the user to the application program 18 is detected by the event processing process 203 or a command interpreter, and then transmitted to the application program 18. As a result, in this embodiment, the application program 18 forms an output 19 described by the PDL source codes, and the PDL parallel processing interpreter 2 receives this output.

When the user requests a printing job to the application program 18 by use of the input device 23, a file 19 described in the PDL is outputted. The file 19 is stored at a specific directory, read at constant regular time intervals by a mechanism for detecting files within the directory, and then given to the process 210 of the PDL parallel processing interpreter 2, all under the file system control of the computer 6a. The printing job has been completed at this point from the user's standpoint. The user's printing request can be realized when the printer 21 outputs a printed paper 12. At this moment, in the present invention, the computer 6a which generates a printing request distributes the PDL translation processing to all the computers 6a, 6b and 6c so that the picture element formation can be executed by the parallel processing of these plural computers.

Figure 4:
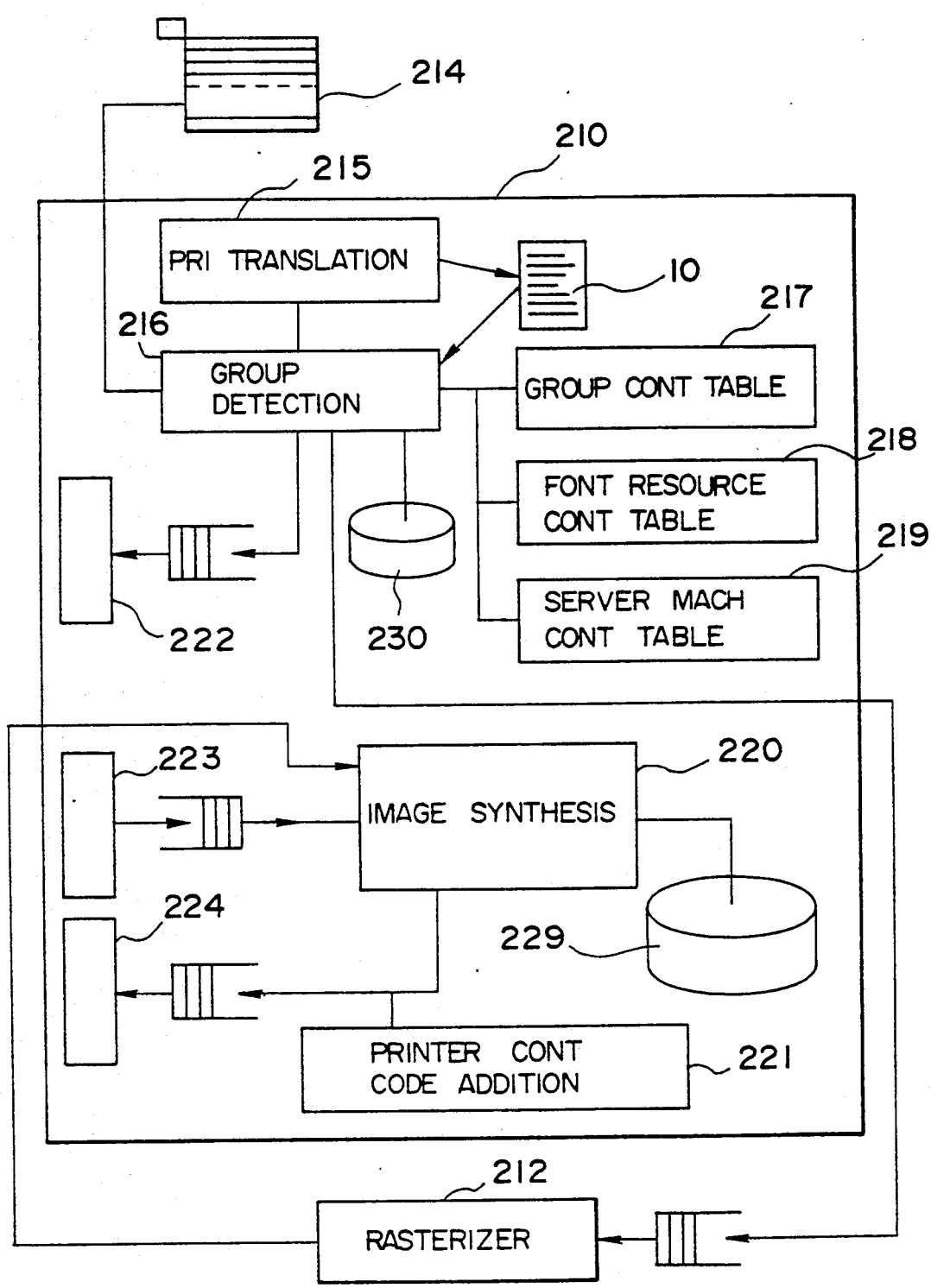
FIG. 4 is a block diagram showing a client process configuration of the computer shown in FIG. 3.

This parallel processing operation will be explained hereinbelow with reference to FIGS. 3, 4 and 5. FIG. 4 shows the function of the processes 210 and 212 within the PDL parallel processing interpreter 2; and FIG. 5 shows the function of the processes 211 and 212 within the PDL parallel-processing interpreter 2.

In FIG. 3, three computers 6a, 6b and 6c are connected to each other via a network 7. The assumption is made that the user's printing request is operated by the user through the computer 6a. Within the parallel processing interpreter 2 of the computer 6a, with reference to FIG. 4, a primary translation processing 215 forms an intermediate code type file 10 suitable for computer processing from the source file 19 described in the PDL. In some PDL specifications, any given coordinate system (referred to as user's coordinate system) is required to be designated when a graphic form is described, because the description is realized without depending upon the resolution of picture elements of the actual print engine. On the other hand, since the actual printing picture elements are handled as picture elements on a device coordinate system in accordance with the physical specifications of the print engine, it is necessary to obtain the description according to the coordinate system of the actual picture element data on the basis of the conversion of the resolution. Further, the predicate of the PDL is of a character string in general, the redundancy is high. The primary translation processing 215 converts the coordinate system and the predicate into a data format more easy to be processed.

The formed intermediate code 10 is divided into plural portions through a group detection processing 216, so as to be handled as if each divided portion is an independent intermediate code. As described later, the intermediate code 10 is divided into as many small portions as possible. This division is effected by the group detecting means 216 of the client process 210 in the computer 6a which generates a printing request. The respective portions of the divided intermediate code strings 230 are outputted to the network 7 via a group transmission socket 222, and then transferred to the respective distributed processing interpreter 2 of the other computers 6b and 6c. In practice, these data strings are received by the server process 211 shown in FIG. 5.

Figure 5:
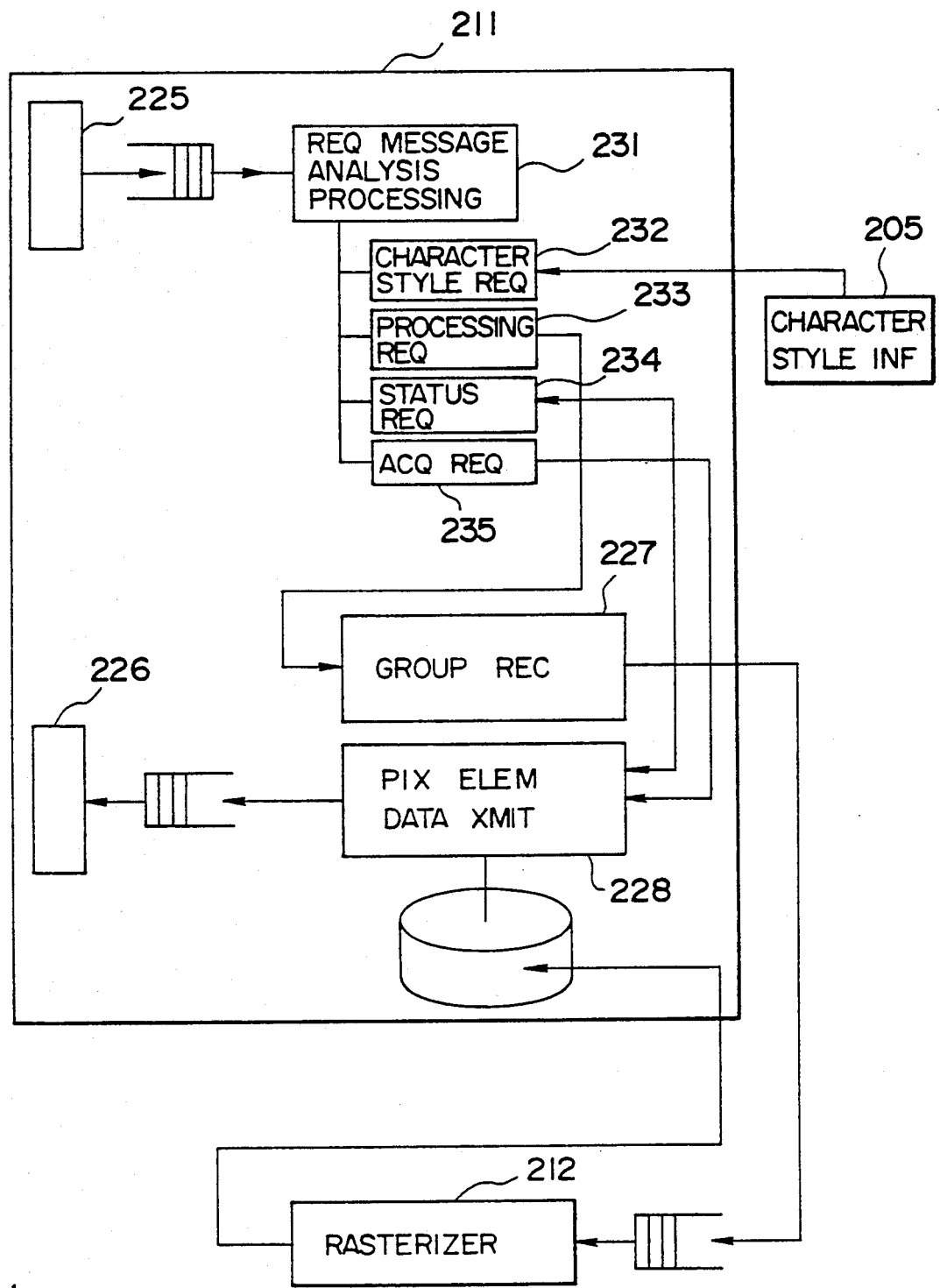
FIG. 5 is a block diagram showing a server process configuration of the computer shown in FIG. 3.

With reference to FIG. 5, each server process 211 of the other computer 6b or 6c receives the intermediate code data strings via a group reception socket 225, extracts the data portion by a group reception processing 227, and transfers them to a rasterizer 212. The rasterizer 212 is a process of forming actual picture elements, at which a dot string is generated on the basis of the description of a curve or a straight line, so that data corresponding to actual printing data are generated on the memory. These data are compressed by a picture element transfer processing 228 and then outputted to the network 7 through the picture element data transmission socket 226.

With reference to FIG. 4 again, on the other hand, the client process 210 of the computer 6a receives picture element data from the respective server processes 211 of the other computers 6b and 6c via the picture element data reception socket 223, and stores these data in an image memory area 229. Further, the parts of the divided intermediate code strings 230 are directly transferred to a direct rasterizer 212 and converted into picture element data. These picture element data are synthesized (or combined) by a picture element synthesize processing 220 to complete printing processing data.

After a series of the above-mentioned processing have been completed, the client process 210 executes a printer control code addition processing 221 for the picture element data in accordance with the physical specifications of the printer 21 and transmits these data from the printing data transmission socket 224 to the printer 21 via the network 7.

With reference to FIG. 2, a network device driver 303 of the printer 21 transmits the data strings received via the network 7 to an engine controller 302. The engine controller 302 rearranges the bit arrangement of picture element data in accordance with the physical specifications of the print engine 301, and outputs the rearranged printing picture element data to the print engine 301, so that a printing output 12 can be obtained.

Figure 6:
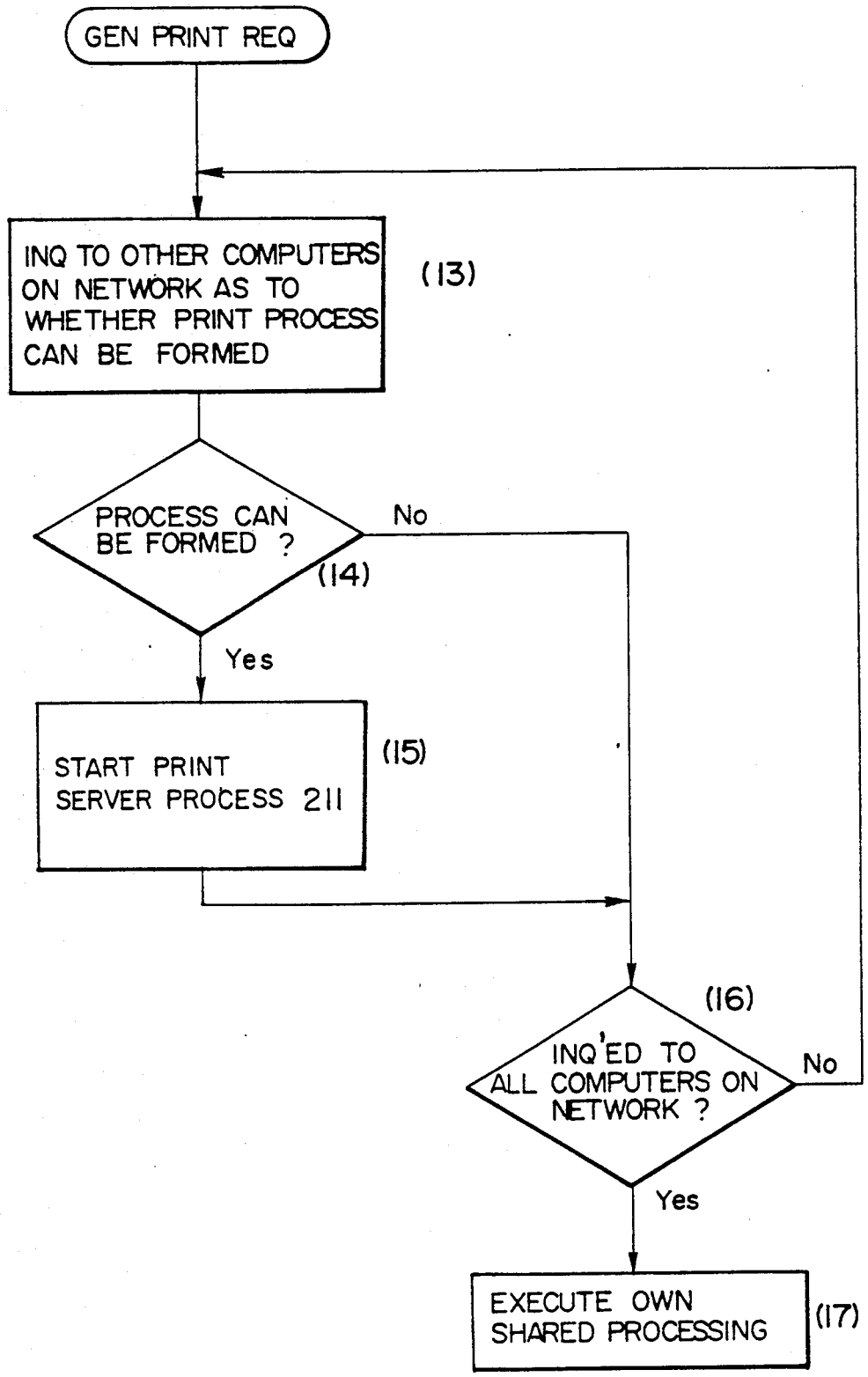
FIG. 6 is a flowchart showing the client process operation shown in FIG. 4.

To realize the above-mentioned processing procedure, the PDL parallel processing interpreter according to the present invention is provided with two advantageous portions, which are described with reference to the flowcharts shown in FIGS. 3, 6 and 7.

When a printing request generated by the application program 18 is transmitted to the parallel processing interpreter 2 via the operating system 4, the parallel processing interpreter 2 executes the printing procedure by use of as many processors as possible. The usable processors are provided within the other computers 6b and 6c, and additionally a processor within the printing unit 21 may be usable. The decision as to whether the distributed processing interpreter 2 can use other processors provided for the other information processing units or not can be determined according to whether the other information processing units respond to a specific format message transferred to the other information processing units.

In more detail, the client process 210 within the parallel processing interpreter 2 of the computer 6a which generates a printing request reads addresses of the computers 6b and 6c connected to the network from the address control table 214 and calls for computers participatable to the distributed processing (in steps 13 to 16). In this case, the client process 210 transmits a message to request participation to the distributed processing to the other computers 6b and 6c via the network. In response to the message to request the participation to the distributed processing, the resident program is actuated to check the current processor load of the computer 6a or 6b, and transmits an answer indicative of the participatability to the distributed processing, as far as necessary memory areas can be secured and the process formation is not obstructed (in steps 25 to 29).

In response to this answer, the computer 6a which generates a printing request operates in such a way that the succeeding procedure can be executed by use of only the information processing units (only the computers in this embodiment; however, a printer can be used in another embodiment) participatable to the distributed processing on the network. Here, the addresses on the network of the information processing units usable for the distributed processing are registered in a server machine control table 219 shown in FIG. 4.

Figure 8:
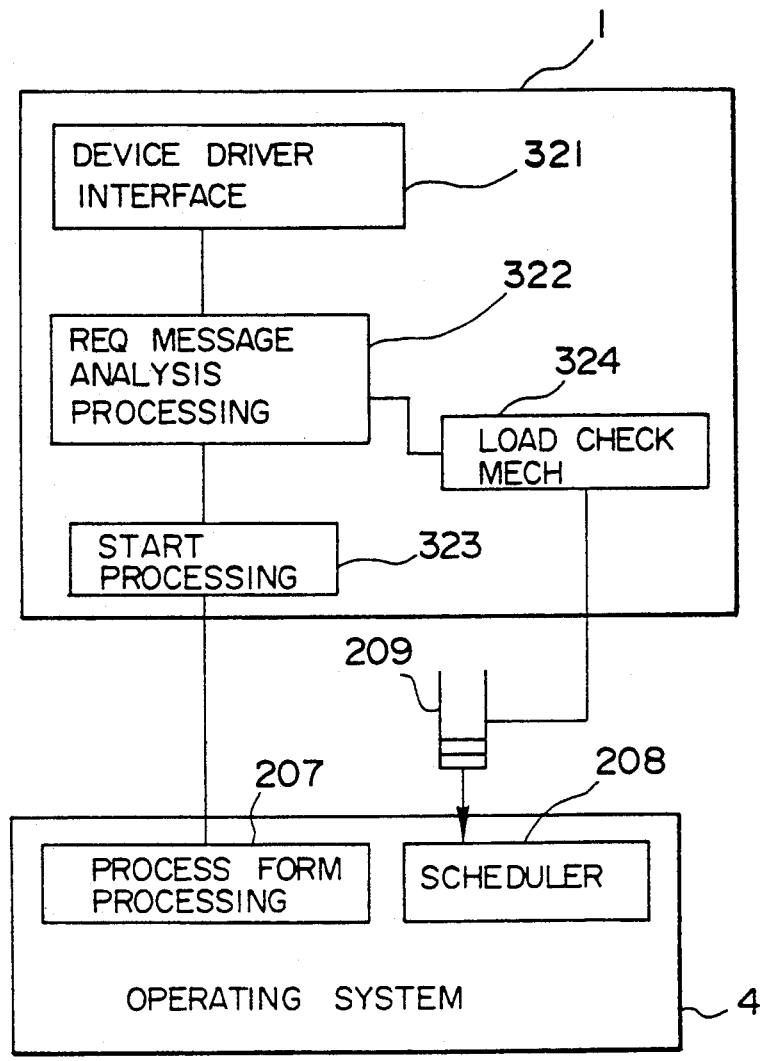
FIG. 8 is a block diagram showing the resident program configuration.

In the above-mentioned processing by use of a network, there exists a possibility that a printing request or another request is generated simultaneously from a plurality of information processing units. Under these request concurrence conditions, all the information processing units provided with the distributed processing interpreter according to the present invention can not respond to the request immediately. FIG. 8 is a block diagram of the resident processing program 1. The processor load can be discriminated by detecting the length of the request queue 209 to the scheduler 208 of the operating system 4. The load detecting mechanism 324 of the resident program 1 determines the degree of the processor load by checking the length of the queue 209 on the basis of interprocess communications, and responds to the request from the client process 210.

The above-mentioned response operation will be described hereinbelow with reference to the flowcharts shown in FIGS. 6 and 7 and the block diagram shown in FIG. 8.

As already described, the information processing units connected on the network can be discriminated by unit identifiers independently given to the respective information processing units on the network. The respective computers can know the respective unit identifiers by use of the broadcast function prepared for the network protocol, and stores the identifiers in a network control table 214 (shown in FIG. 4). Therefore, the computer which generates a printing request transmits a message to inquire the possibility of starting of the server process 211 to any one of the information processing units on the network, as shown by step 13 in FIG. 6.

As shown in FIG. 8, within the information processing unit, the message received via the network device driver 213 is given to a request message analysis processing 322 via a device driver interface 321. The information resident processing program 1 which receives this message operates in accordance with the flowchart as shown in FIG. 7. That is, control first checks whether the message requests a status confirmation and an answer in step 25. If YES, control checks the amount of the request for the processor in step 26, and further determines that no problem arises even if a new process is formed under the current load in step 27. If no problem arises, control proceeds to step 28 to check the status of use of the memory, and confirms that a new process can be formed in step 29. If no problem arises in all the cases, a normal end code is returned. If some problems arise in step 27 or 29, control returns an error code.

When a normal end code is returned, the computer which generates a printing request regards it as the return of an acceptance message. Further, no acceptance message is returned from the information processing units provided with no parallel processing interpreter of the present invention. This determination is executed in step 14 shown in FIG. 6. When an acceptance message is returned, a message is transmitted again to the responded information processing unit as shown in step 15 so that the process is started to activate the distributed processing interpreter. In response to this message, the information processing unit discriminates whether the received message is a process formation request message in step 30 in FIG. 7. If YES, a new process 211 is formed in step 31. In the configuration shown in FIG. 8, a starting processing 323 is executed, and a server process 211 is formed by a forming mechanism 207 of the operating system 4.

The client process 210 of the computer which generates a printing request checks whether the possibility of starting the server process has been inquired to all the information processing units on the network on the basis of the network control table 214 in step 16. If NO, the processing of steps 13, 14 and 15 is repeated to the information processing units to which the possibility is not yet inquired. When it has been inquired to all the units, the PDL translation processing to be executed by itself starts in step 17. As already described, the client process 210 executes this translation process by use of the rasterizer 212.

The software operation required when the PDL distributed processing interpreter of the present embodiment is executed will be described hereinbelow in detail. The description thereof is roughly composed of the following four points:

(A) The computer which generates a printing request must know that any kinds of fonts are stored in the auxiliary memory unit of the respective computers which execute the translation distributed processing on the network.

(B) The physical conditions such as the resolution, paper size, etc. of the printing unit now being operated must be indicated in common to all the computers for executing the translation distributed processing of a PDL source file in response to "printing request" now being executed on the network.

(C) The graphic form group must be detected from the source file and divided for each group, so that a printing image quite the same as that obtained when all the portions are replaced with sequential picture elements can be obtained, even if the PDL source file is divided; the respective divided portions are translated into picture elements, independently; and the translated picture elements are overlapped with each other in the other procedure, later.

(D) The information processing units on the network which share the translation processing of the respective divided file portions must be recorded, and the respective execution status must be grasped.

With reference to FIG. 2, information related to character style, size and ornament is added to the transferred character codes, in addition to the actual character string, when the process is executed such that the computer 6a which generates a printing request transfers character codes to a plurality of other computers 6b and 6c on the network and further receives bit maps obtained by the translation processings from these computers 6b and 6c. For instance, information to be transferred to convert a character string of "weather of Kanto districts" into printing data may be {FONT=lightfaced}+{number of points=12}+{character ornament=Skew}+"Weather"+{FONT=lightfaced}+{number of points=12}+"of Kanto districts". Even if the character information of such a layout as described above is transferred to the computer 6c, when there exist no character style data to form the printing character data of lightfaced print style in the computer 6c, it is impossible to form a bit map. Here, "character style data" implies a so-called "outline font" such that picture elements actually used for printing are formed on the basis of original data for determining the outer forms and the curve types representative of the outer forms, or a so-called "bit map font" such that 0/1 data of picture elements given to represent each character of a predetermined size are gathered into a group. However, the computer 6a must request the conversion processing 6c of the above-mentioned character string into printing data to the computer 6c, at least after the computer 6a knows that the computer 6c is provided with means for processing the characters such as {character style=lightfaced print style}, {number of points=12}, etc.

Figure 7:
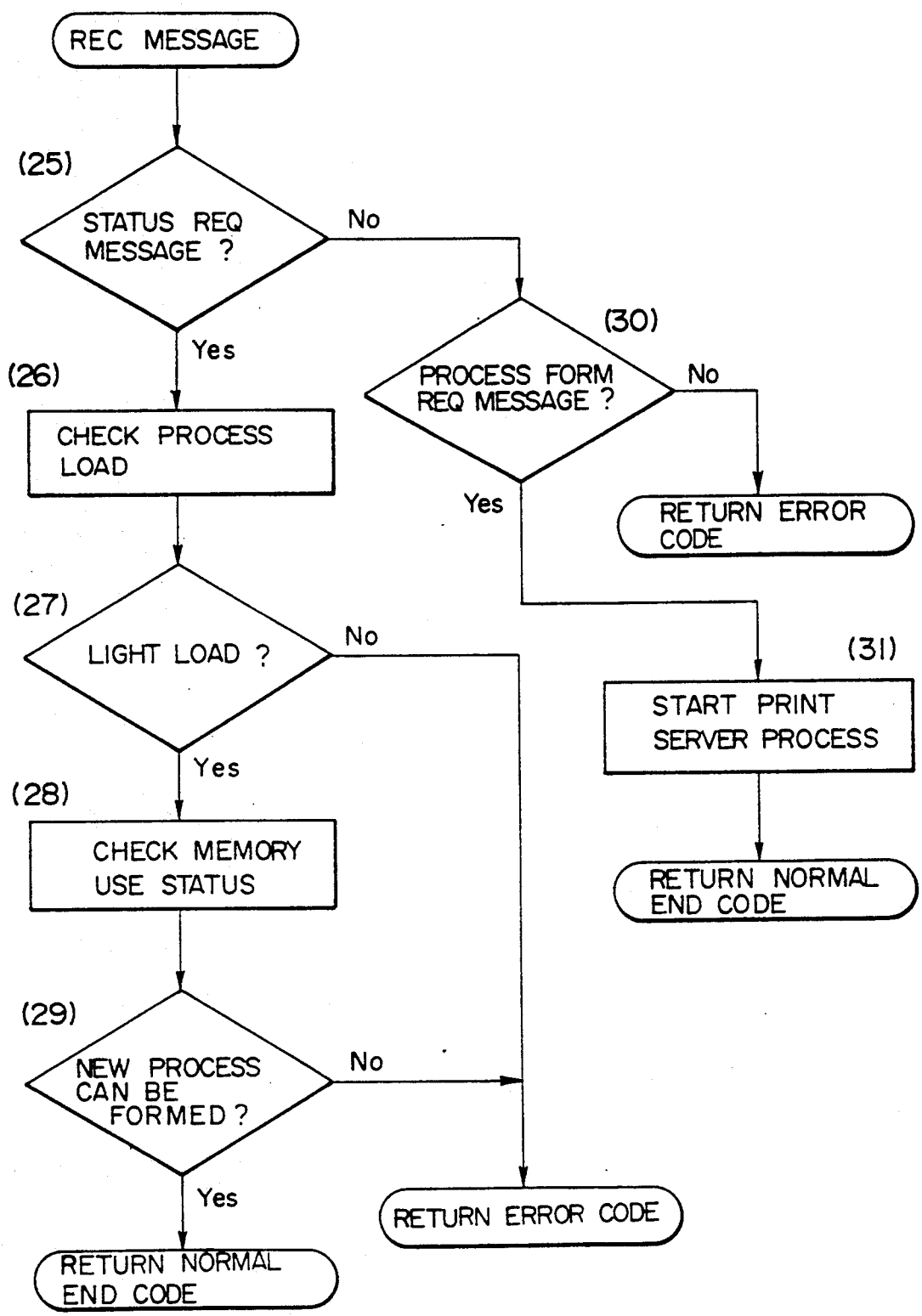
FIG. 7 is a flowchart showing a resident program operation shown in FIG. 3.

Since a plurality of character styles are used for a single document, it is not known that all the character styles can be available by all the computers just prior to the printing processing, because the computer user can always erase data of unnecessary character styles. To prevent the disadvantages as described above, in the present invention, the messages are received and transmitted in accordance with the processing as follows:

The information processing units on the network which can execute the distributed processing in response to a printing request now being generated are the ones which have already executed normally all the processings from the steps 25 to 31 in the flowchart shown in FIG. 7. The network addresses of these units have already been stored in the server machine control table 219 shown in FIG. 4. The processing down to the step 31 in FIG. 7 is executed by the resident processing program 1 shown in FIG. 3 in the server side information processing unit (e.g. computer 6c). Thereafter, the server process 211 formed in step 31 in FIG. 7 controls the rasterizer process 212 of the PDL parallel processing interpreter 2 to form the actual printing data, in accordance with the message transferred from the network. The server process structure members as listed in Table 1 below in this embodiment.

TABLE 1

| Structure Member | Variable Type | Meaning of Variables |
|---|---|---|
| FontName | string | Name of font |
| BOSelection | integer | Bit map font if 0 |
| Size | integer | Size (See Spec) |
| FDPtr | longint | Address at which font data are stored |
| CurvAlgo | word | Trap word of interpolation curve processing |

TABLE 1-continued

| Structure Member | Variable Type | Meaning of Variables |
|---|---|---|
| FixAlgo | word | Trap word of end processing |
| FillAlgo | word | Trap word of filling processing |
| ProcPtr | longint | Address at which additional processing procedure starts |

In Table 1, the variable type "string" represents a character string; the variable type "integer" represents an integer of 16 bits; "word" represents an integer of 16 bits without a sign; "longint" represents an integer of 32 bits; the structure member "BOSelection" represents the use of bit map font if zero; and "Size" represents the size in the case of the bit map font and the upper limit size where the hinting procedure is to be executed in the case of the outline font.

The client process 210 which receives the response messages as described above can know what styles of font are provided for each of the information processing unit group participatable to the distributed processing on the network. As a result, the font resource control table 218 is updated in the client process 210. As shown in FIG. 4, the process 210 controls the information of the address and the communication sockets on the network of the server computer for executing the parallel processing 211 behaves as one of the application programs. That is, the server process 211 secures necessary memory, input/output channels, etc. by use of the system calls of the operating system. However, this server process 211 is different from the general application programs in that processing starts and ends without any user's notice, because the server process 211 includes no interactive operation to the user interface.

With reference to FIG. 5 again, the client process 210 of the client side computer transmits the following four kinds of messages to the server process 211 of the server side computer. These messages are received from the network by the group reception socket 225. The server process 211 reads the messages from the received packet by the request message analysis processing 231 so as to respond thereto. The four kinds of respondable messages are:

Character style request
Processing request
Status request
Acquisition request

These messages will be explained hereinbelow in sequence.

(1) Character style message

Figure 9:
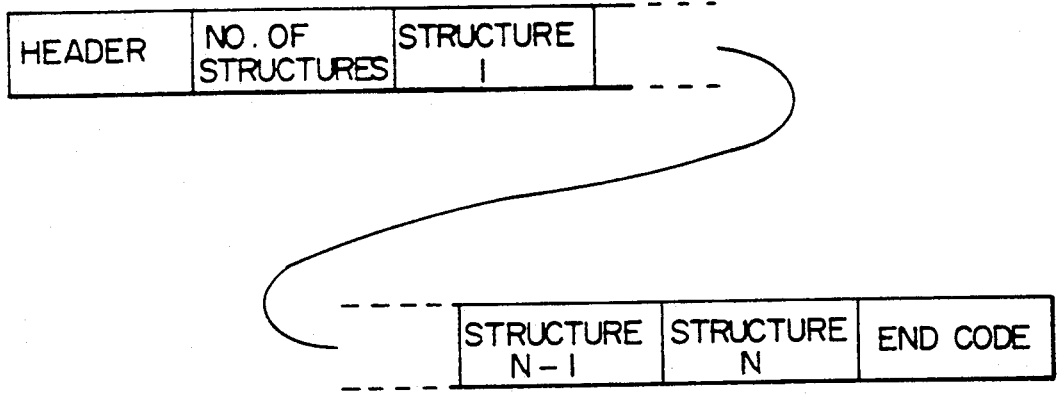
FIG. 9 is an illustration for assistance in explaining response message specifications.

When the process 211 receives a character style request message, a character style request processing 232 has access to a character style data 205 to immediately set the character style data files of all the currently provided fonts to "Unchanged, unabandoned" state, and returns a response message of the specifications as shown in FIG. 9. The message is composed of four portions of a header indicative of a response to the process 210, the numbers of structure included in the response message, a plurality of structures corresponding to the number of structures, and an end code. Here, the structures returned as a response are a data string composed of the in accordance with the server machine control table 219. Since the font resources related to the address of the server computer are controlled in accordance with the above procedure, when the character string processing request is transmitted to the server process 211, only the request that needs the font resources existing in the information unit in which the server process 211 is running is transmitted. Further, when a series of translation distributed processing have been completed, a message is transmitted to the process 211 to release the attribute of "Unchanged, unabandoned" previously designated to the font data.

(2) Processing request

Figure 10:
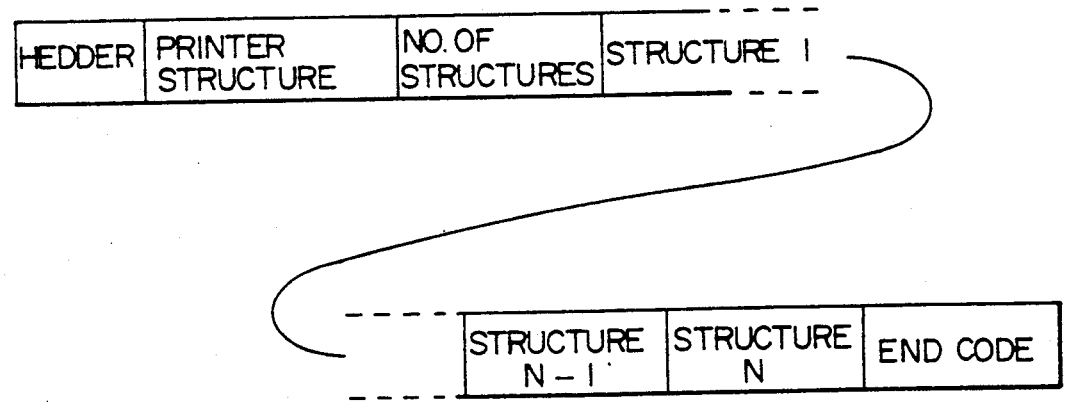
FIG. 10 is an illustration for assistance in explaining response message specifications including printer structures.

Next, the client process 210 transmits a processing request to each server process 211. The processing 233 responsive to the processing request of the process 211 activates a group receiving means 227 to execute the following processing:

The processing request requests each practical PDL processing. In the case of this embodiment, a message of the specifications as shown in FIG. 10 is transmitted. The message includes a header indicative of a message from the client process 210 and the printer structure. Table 2 lists the structure members of the printer structure.

TABLE 2

| Structure Member | Variable Type | Meaning of Variables |
|---|---|---|
| ClippingLTH | integer | Clipping value on left top end (horizontal direction) |
| ClippingLTV | integer | Clipping value on left top end (vertical direction) |
| ClippingRBH | integer | Clipping value on right bottom end (horizontal direction) |
| ClippingRBV | integer | Clipping value of right bottom end (vertical direction) |
| ResolutionH | integer | Resolution in horizontal direction |
| ResolutionV | integer | Resolution in vertical direction |
| RGB | integer | Color designation |
| ProcPtr | longint | Address at which additional processing procedure starts |

A rectangular printing area is set on a printing paper by the left top coordinates and the right bottom coordinates designated by four 16-bit integers represented by the members of:

(clipping LTH, clipping LTV, clipping RBH, clipping RBV)

Further, physical specifications of the printing unit are determined by the printing density in both horizontal and vertical directions designated by two 16-bit integers represented by the members of:

(Resolution H, Resolution V)

Here, the printing density is a value indicative of the number of picture elements per inch, and the coordinate data are relative values to the resolution. For instance, in the case of a printing unit where the resolution is 300 dots per inch and the maximum printable length is 8 inches in the horizontal direction, a difference between (clipping LTH) and (clipping RBH) is 2400. The number RGB is used as a trap word and the member ProcPtr is a reservation area for storing a pointer indicative of a function used when an additional processing procedure inherent in the printer is required. The respective values of RGB and ProcPtr are entered by the processing of the server side process 211. After the above-mentioned printer structure, the structure constructed by intermediate language obtained by processing actual PDL source codes follows, and an end code follows the intermediate language structure. Further, "trap word" implies an instruction word indicative of software interrupt instruction used to call a function of the operation system. However, it is well known that non-packaged instruction or incorrect instructions can be used for the same purpose, in addition to the software interrupts by instruction words originally prepared for the processor.

(3) Status request/Acquisition request

As described above, the client process 210 generates a partial translation processing request of a document described in the PDL to the server process 211. Thereafter, the client process 210 also shares and execute another partial translation processing of the same document. Upon completion of the partial processing, the client process 210 transmits a status request message to the respective server process 211. In each server process 211, the status request message activates the processing 234 to monitor the formation status of picture element data. The client process 210 generates an acquisition request message to the information processing units from which a processing end message is returned. In the client process 211 of these information processing units, the acquisition request message activates the processing 235 to control the picture element data transmission processing 228, so that printing data formed by the translation processing are transferred. The client process 210 receives printing data bit maps from these information processing units.

The printing data transferred from the server process 211 to the client process 210 on the network are a data string sandwiched between a header and an end code. The number of bytes of the data string and the designation of compression method are included in the header. After having confirmed that printing data are returned from all the server processes 211 in response to the acquisition request, the client process 210 overlaps the acquired printing data with each other by use of an auxiliary storage unit such as a hard disk device, and transfers the overlapped results to the printing unit to output a print. A group control table 217 is used to control the processing status, as described later in further detail.

Means for appropriately dividing the source file described in the PDL into a plurality of portions thereof will be described hereinbelow. For clarification of the explanation, an example will be described in which only the following two "procedures" of the PDL are used. Here, "procedure" implies a single execution unit of the programming language syntax, which is similar to a unit being handled usually as "PROCEDURE" in a programming language Pascal (ANSI/IEEE 770X3, 97, ISO 7185, British BS 6192). The other similar examples of the programming languages are "Function having no return value" of the programming language C, "Subroutine call" of FORTRAN.

Procedure: FillPolygon (Argument ↑ Polygon)
Procedure: InvertPolygon (Argument ↑ Polygon)

Prior to the use of the above procedure, the following data format is previously defined:
Integers of 16 bits: N, H, V
Data format Coordinates:
Array composed of two elements (H, V)
Structure Polygon:
(Angle number of polygon N, N-piece coordinate set)
Pointer indicative of structure "Polygon" = ↑ Polygon That is, N, H and V are integers between −32768 and 32767; coordinates are described by an array composed of a horizontal direction value H and a vertical direction value V; and a polygon is a structure for describing a graphic form having N-piece coordinates represented by integers N. "Polygon" implies a graphic form obtained by connecting the N-piece coordinates beginning from the first coordinates to the n-th coordinates in sequence by straight lines and finally by connecting the n-th coordinates to the first coordinates again to close the graphic form. Therefore, if N=6, the polygon is not necessarily a hexagon. Further, when the inside of the graphic form generated by the polygonal structure is filled (e.g. in black), even if areas closed by repeatedly connecting the (i−1)th coordinates to the i-th coordinates are produced, the closed areas are not necessarily filled, because of "Filling algorithm" used in the present embodiment.

Figure 11:
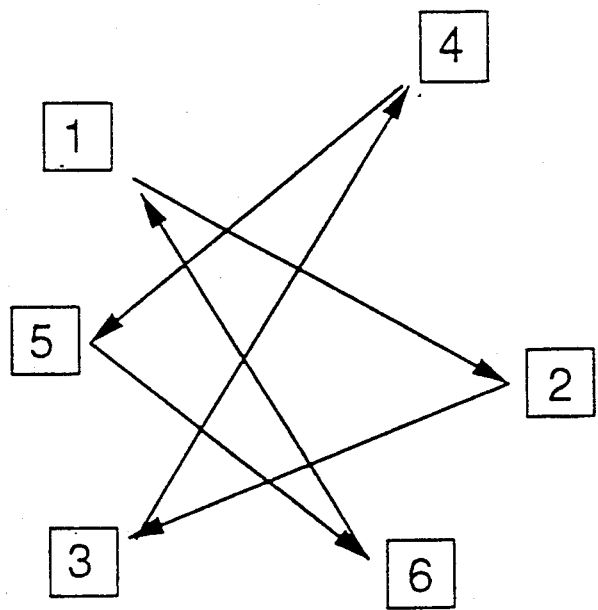
FIG. 11 is an illustration for assistance in explaining the procedure of describing a polygon.
Figure 12:
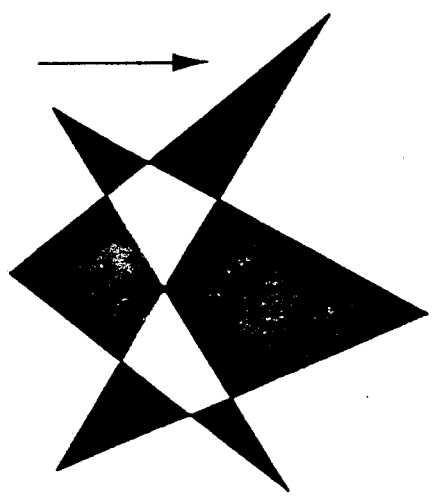
FIG. 12 is an illustration for assistance in explaining an example of a polygon partially filled.

FIGS. 11 and 12 show an example thereof. FIG. 11 is an illustration showing a procedure of describing straight lines when a graphic form is written by the polygonal structure of N=6. The polygonal structure includes coordinates arranged in the order of numbers enclosed in squares in FIG. 11. Therefore, even if straight lines are drawn in the order of the arrows in FIG. 11, the polygon is not a hexagonal. FIG. 12 shows a graphic form obtained by filling a polygon written on this structure. The areas represented in black color are filled in color (e.g. black). There exist areas which are closed by straight lines in the same way but not filled with black. To clarify this reason, "Filling algorithm" used in this embodiment will be explained with reference to FIGS. 13, 14 and 15. In the following description, the direction of an arrow shown in FIG. 12 is regarded as "horizontal". Further, the printing processing executed in the present invention is for only white-black binary image, for simplification. Therefore, the discrimination of printing/non-printing of picture elements is determined by 0/1 value of one bit, where=1 decides printing. In the PDL used in the present invention, a processing unit composed of 8 bits in the horizontal direction is determined, and this unit is referred to as "one byte". Although the actual processing is executed in the unit of 32 bits (4 bytes), a unit of 8 bits is handled in the description of the drawing.

Figure 13:
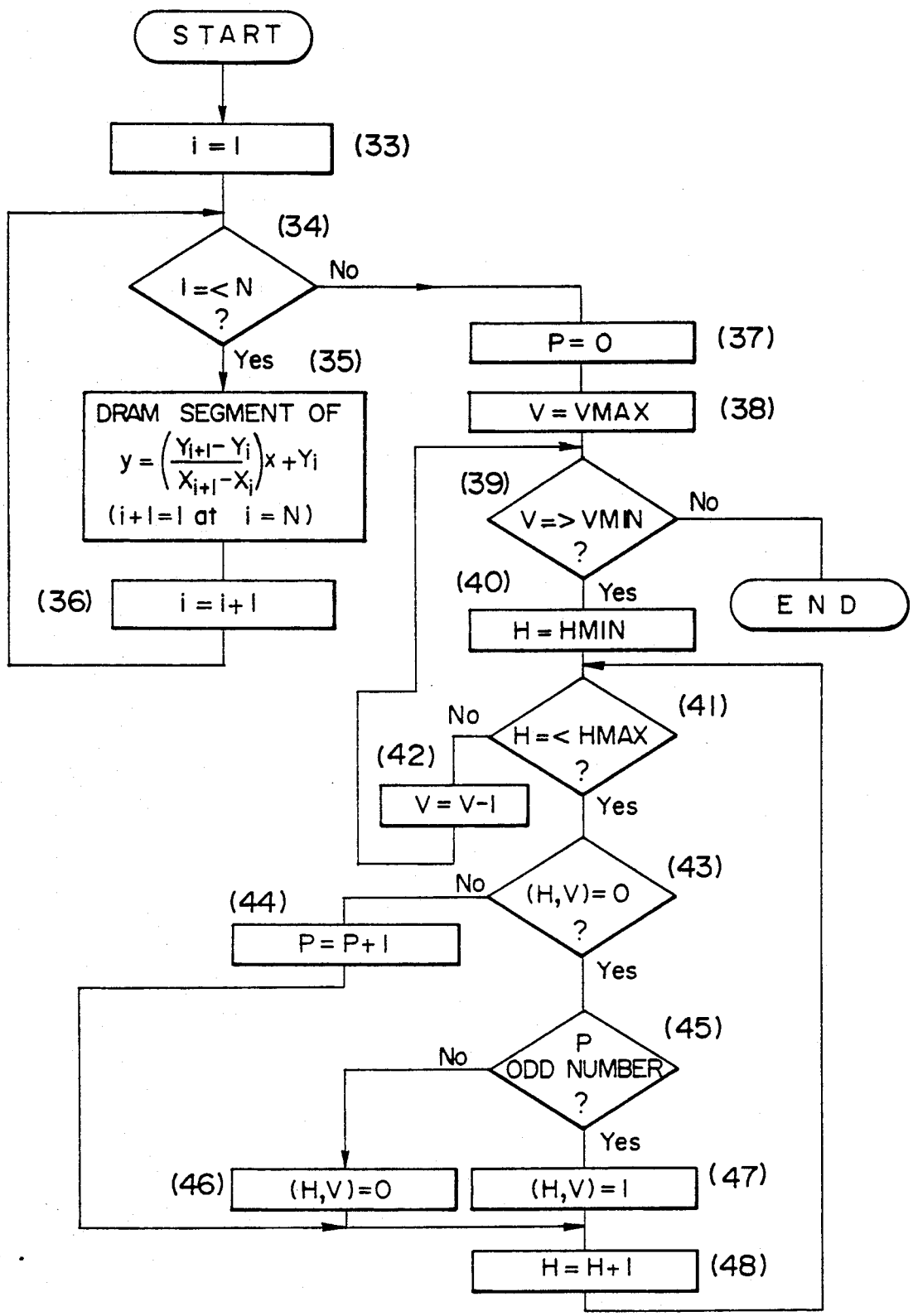
FIG. 13 is a flowchart showing the filling algorithm.
Figure 14:
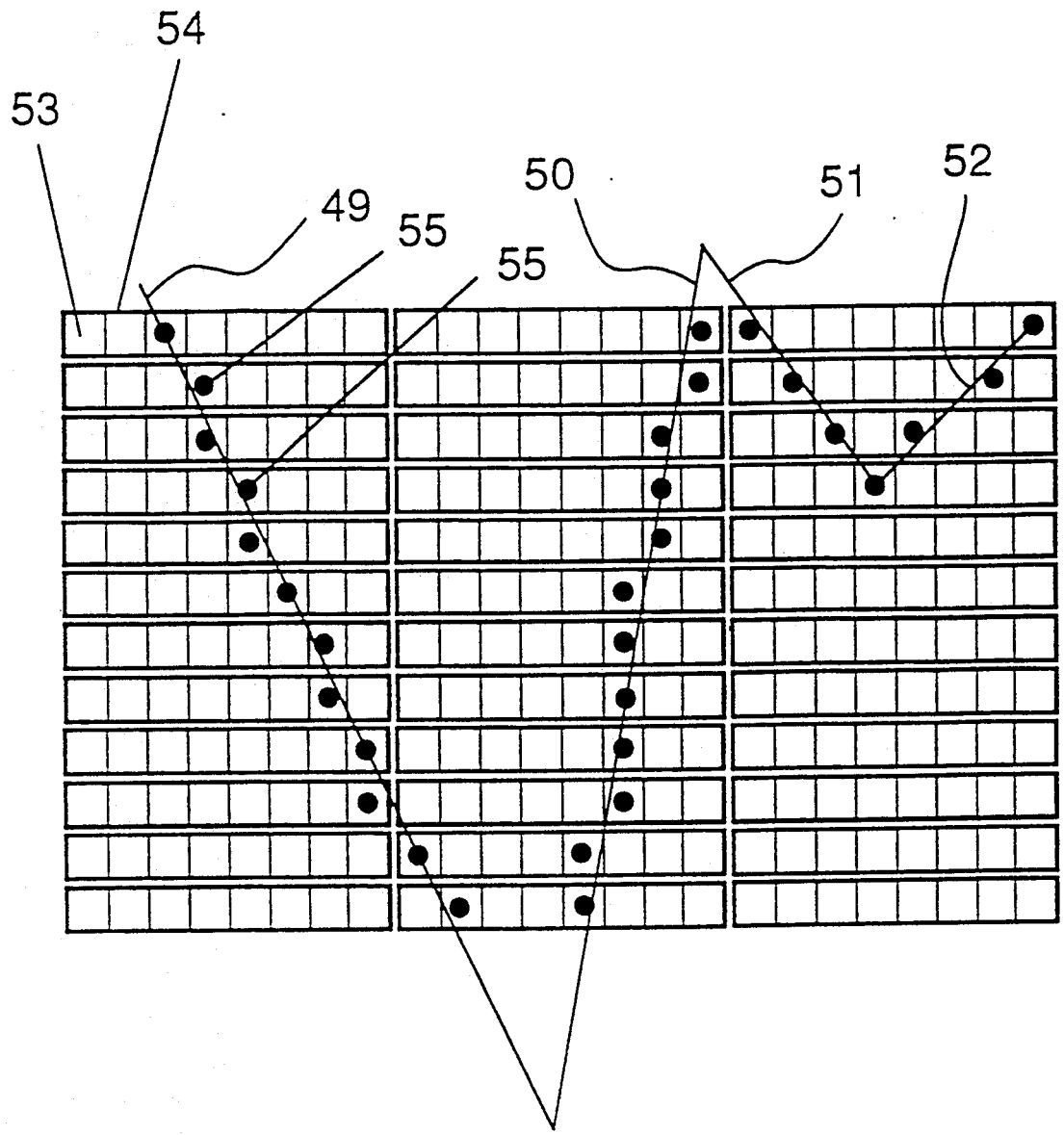
FIGS. 14 and 15 are illustrations for assistance in explaining the filling algorithms.

FIG. 13 shows a flowchart of "Filling algorithm" used in the present invention. In the flowchart, one-bit picture element located at a position where "the horizontal coordinate value is H" and "the vertical coordinate value is V" is represented as (H, V). Further, the variable i is used to count N-piece coordinate values in sequence; x is used to determine the horizontal axis position (abscissa); y is used to determine the vertical axis position (ordinate); and P is temporarily used to discriminate even and odd numbers. First, i=1 is set (in step 33). If i=<N, the processing is repeated (in step 34). Next, the i-th point is connected to the (i+1)th point by a straight line. When the i-th coordinates are written as (xi, yi), this indicates that a point (Xi, Yi) and a point (Xi+1, Yi+1) are connected at a section between Xi and Xi+1 by a linear equation as (in step 35)

$$y = (Yi+1 - Yi)/(Xi+1 - Xi) * x + Yi$$

However, if i=N, the above processing is executed by regarding as i+1=1. The above processing is repeated by incrementing i (in step 36). In step 35, the values x are obtained at a section between y=Yi and y=Yi+1 by use of an equation as $$x = (y - Yi) * (Xi+1 - Xi)/(Yi+1 - Yi)$$

and the bit represented by the remainder portion of (x÷8) in one byte given by 1+integer of (x÷8) in the horizontal coordinate position (abscissa) is set to 1. The vertical displacement is given with a value determined by the resolution of the printer structure as an increment, as shown by a segment 49 shown in FIG. 14. However, FIGS. 14 and 15 both show a part of a closed graphic form. Although there exists no thickness in a mathematical segment, Bits 55 to be printed are produced at locations of one byte (on a memory beginning from the 0 bit location 53), through which the segment 49 is passed. Similarly, after segments 50, 51 and 52 are drawn, bits 55 to be printed (black circles in FIG. 14) are produced on the memory at locations through which the respective segments are passed.

With reference to FIG. 13 again, from among the N-piece coordinates obtained by the processing so far executed, the maximum and minimum values in both the horizontal and vertical directions have been obtained. Therefore, these values are represented as HMAX (the maximum coordinate value in the horizontal direction), HMIN (the minimum coordinate value in the horizontal direction), VMAX (the maximum coordinate value in the vertical direction), and VMIN (the minimum coordinate value in the vertical direction). Since picture elements to be printed are determined on the segment locations on the image memory, areas enclosed by these picture elements are detected, and the bits thereat are set to 1. For this processing, the temporary variable P is set to 0 (in step 37). The maximum value VMAX is substituted for the variable V representative of the displacement in the vertical direction (in step 38). The processing after step 38 is repeated as far as V>=VMIN (in step 39). That is, the value HMIN is substituted for the variable H representative of the displacement in the horizontal direction (in step 40), control checks whether the bit at the location given by the coordinates (H, V) is 0 (in step 43). If bit=1 (NO) in step 43, the variable P is incremented (in step 14). Since the initial value of the variable P is 0, the variable P is always 1 at the printed bits (=1) 55, which are caused by the segment 49 in FIG. 14. After step 44, the displacement H in the horizontal direction is incremented (in step 48). Control checks whether H exceeds the maximum value in the horizontal direction (in step 41). If H≦HMAX, the processing after step 43 is repeated. If H>HMAX (in step 41), the displacement in the vertical direction is decremented (in step 42), and control returns to the afore-mentioned determination (step 39). On the other hand, if YES in step 43, since (H, V)=0 at the coordinate positions between the two segments 49 and 50 in FIG. 14 for instance, control checks whether the variable P is an odd number (in step 45). If YES, the bit is set to (H, V)=1 (in step 47). The above steps are repeated. If the coordinate position reaches the segment 50, since (H, V)=1 in step 43, P is incremented as P=P+1 in step 44. Therefore, since P is an even number in the segment 50 and (H, V)=0 in step 46, the bit is not set to =1. This status is maintained until P changes to an odd number again at the locations of the segment 51. After having passed through the segment 52, P is set to an even number.

Figure 15:
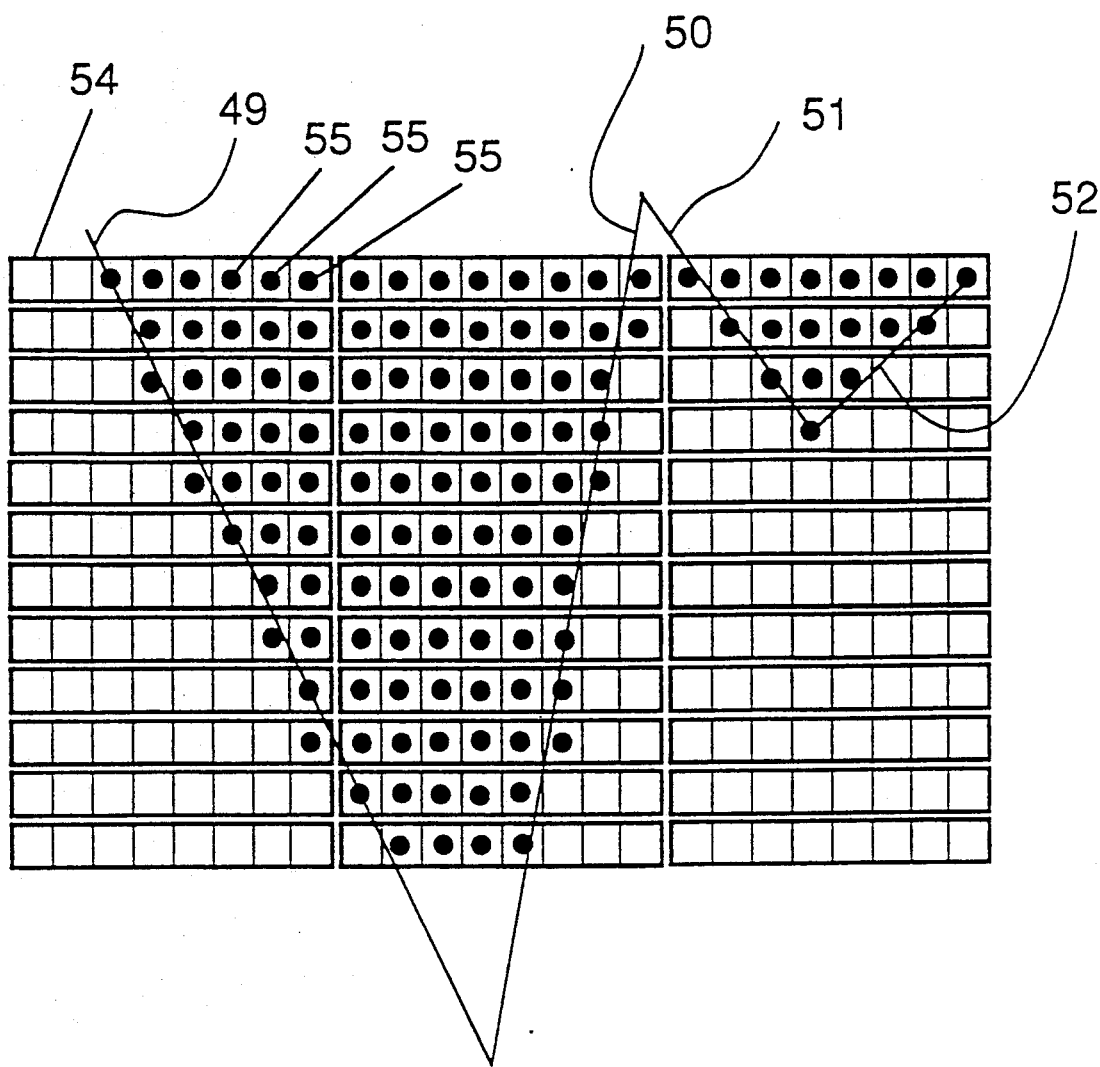

The variable P is repeatedly set to even/odd numbers on the basis of the segments 49, 50, 51 and 52 to fill the areas in black. FIG. 15 shows the black fill results, in which bits 55 are shown by black circles. Therefore, when the black filling algorithm is executed, the polygon shown in FIG. 11 is filled in black into a graphic form shown in FIG. 12.

The procedure "FillPolygon" executes the above-mentioned filling processing to any given polygon. Further, a procedure "InvertPolygon" executes inversion of bits at the areas enclosed by segments in accordance with the even/odd rule similar to the procedure of "FillPolygon".

By use of these two procedures, the execution of the following programs will be explained.

| | |
|---|---|
| Polygon A = | ( 6, |
| | (0, 87), (22, 93), (92, 51), |
| | (92, 82), (20, 27), (0, 33) ) |
| Polygon B = | ( 4, |
| | (34, 58), (55, 58), (55, 34), |
| | (34, 34) ) |
| Polygon C = | ( 4, |
| | (17, 51), (78, 51), (78, 0), |
| | (17, 0) ) |
| FillPolygon ( ↑ Polygon A) | |
| FillPolygon ( ↑ Polygon B) | |
| InvertPolygon ( ↑ Polygon C) | |

The above program (which is different from the executable program because of only explanation) will be described hereinbelow with reference to FIG. 16. The above program first defines a polygon A 56 determined by six coordinates; a polygon B 57 and a polygon C 58 both determined by four coordinates. However, at the stage where the substitution is made to define the coordinates of these polygons, the segments as shown in FIG. 16 cannot be seen. FIG. 16 is an illustration for assistance in only explaining the graphic forms of these polygons A, B and C. When the above program procedure is executed in sequence, a graphic form as shown in FIG. 17 can be obtained. That is, after the area inside the polygon 56 is filled in black and the area inside the polygon 57 is filled in black, the area inside the polygon 58 is bit-inverted, so that an area filled in white appears.

In case "distributed processing" which is the feature of the present invention is executed erroneously, the following problem arises. For instance, in the system configuration shown in FIG. 2, after the distributed processing interpreter 2 of the computer 6a executes.

| | |
|---|---|
| Polygon A = | ( 6, |
| | (0, 87), (22, 93), (92, 51), |
| | (92, 82), (20, 27), (0, 33) ) |
| Polygon B = | ( 4, |
| | (34, 58), (55, 58), (55, 34), |
| | (34, 34) ) |
| FillPolygon ( ↑ Polygon A) | |
| FillPolygon ( ↑ Polygon B) | |
| and further the distributed processing interpreter 2 of the computer 6b executes simultaneously | |
| Polygon C = | ( 4, |
| | (17, 51), (78, 51), (78, 0), |
| | (17, 0) ) |
| InvertPolygon ( ↑ Polygon C) | |

When these processed results are simply overlapped with each other by the distributed processing interpreter 2 of the computer 6a, the obtained result becomes as shown in FIG. 18, which is a matter of course because in the above program, the succeeding procedure is executed in response to the result of the preceding procedure.

This is a problem always caused when the distributed processing is executed by the interpreters. One of the methods of overcoming this problem is to provide a strong restriction to the PDL grammar so as to realize language specifications such that the succeeding procedure is executed without reference to the preceding procedure. In this method, however, since the load in the application coding process increases, the above-mentioned method is not adopted in this embodiment. That is, the above problem has been solved by another means in the present invention. Namely, being different from the interpreter for calculation/general purpose programs used for program languages such as BASIC, the object of the PDL interpreter is to convert characters and graphic forms into picture elements. This indicates that when a plurality of graphic form groups (each of which is formed by overlapping plural characters/graphic forms with each other) exist on a single page printing paper, as far as the respective "graphic groups" are located independently in the space being apart from each other, it is possible to convert the graphic form group into picture elements for each "separated group".

In the present invention, therefore, "means for detecting graphic form groups which will not exert any influence upon the other graphic forms even if separated" has been invented so as to be incorporated in the PDL parallel processing interpreters. Examples of the above-mentioned means will be described hereinbelow.

In several embodiments described hereinbelow, the common important point is how to detect the overlap of graphic forms before converting the graphic forms into picture elements. Since the object of the present invention is to distributed the conversion into picture elements, it is meaningless that the graphic form overlap is detected after the actual picture elements have been formed. In the following examples, the description is made by use of polygons and ovals, and the assumption is made that there are codes previously described in accordance with the previously explained PDL specifications or those similar thereto, so that the coordinate values of a polygon are known prior to the processing of the present invention (i.e. the coordinate values can be read for reference).

(1) Example 1 of group discrimination

Figure 19:
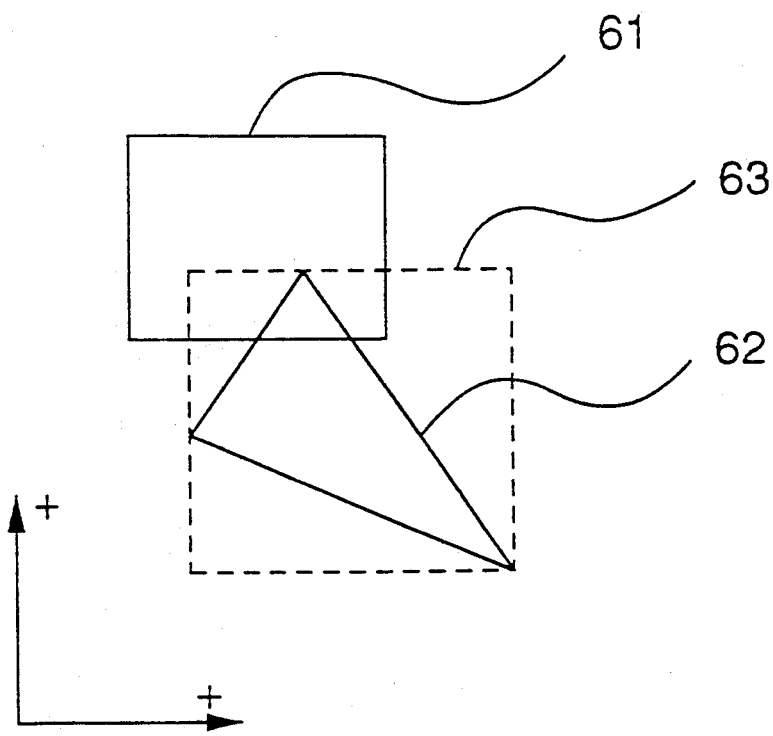
FIGS. 19 and 20 are illustrations for assistance in explaining the first method of discriminating graphic form groups.
Figure 20:
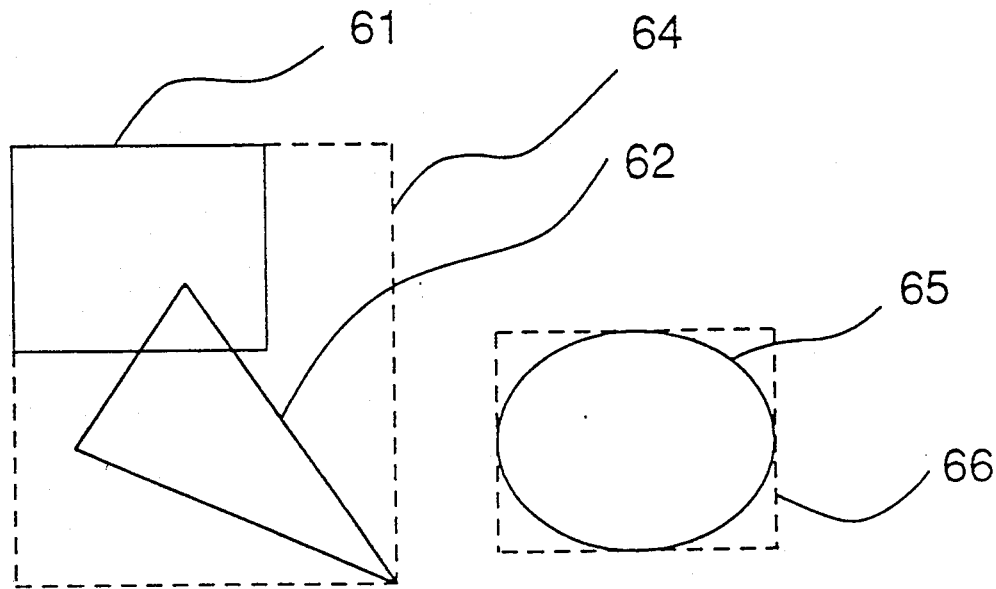
Figure 21:
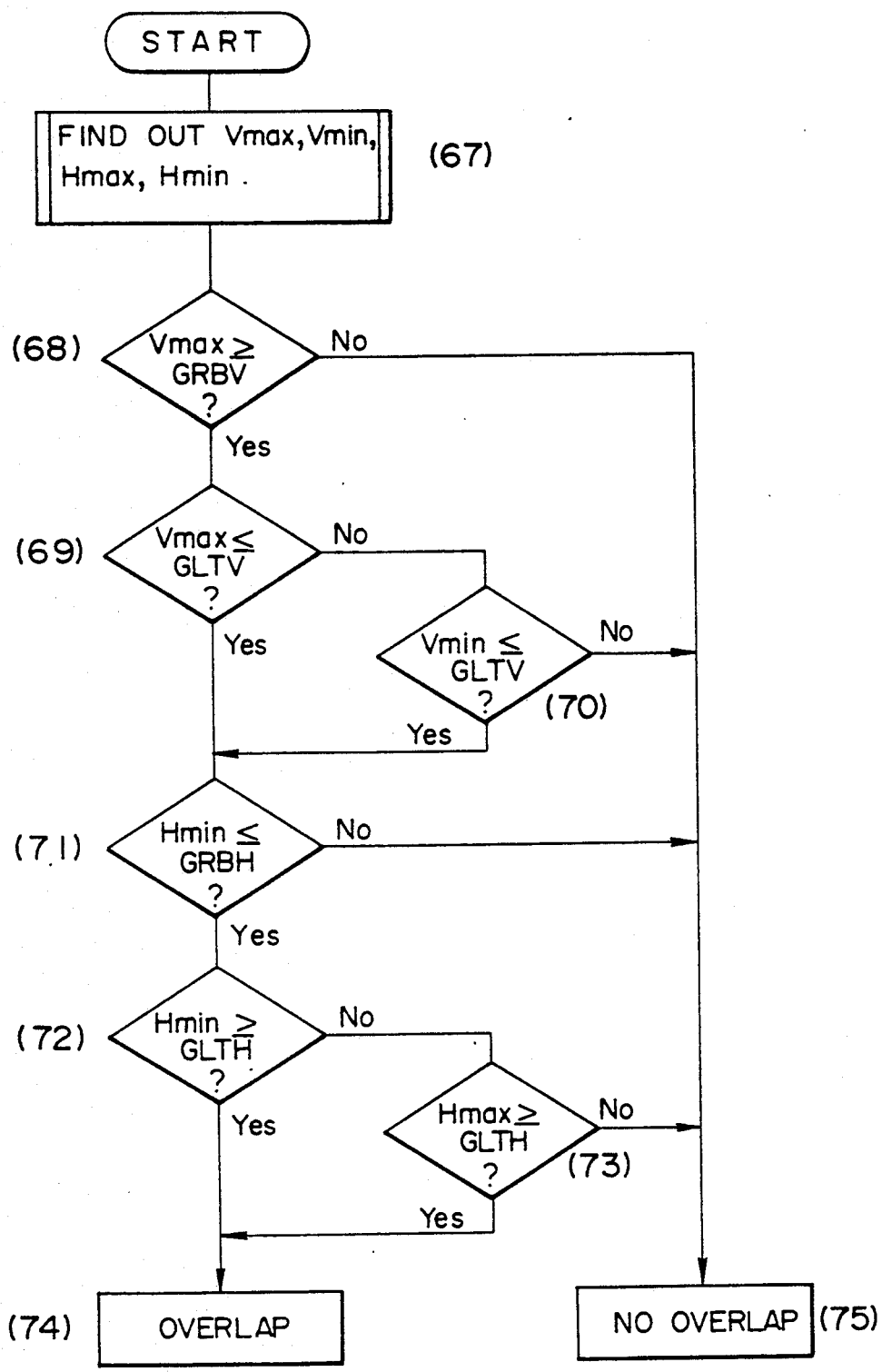
FIG. 21 is a flowchart showing the procedure of detecting an overlap of graphic form elements of the example shown in FIGS. 19 and 20.

With reference to FIGS. 19, 20 and 21, the intention of the source codes written in the PDL is assumed as follows:
Procedure 1:
  Operation is added to an area of a rectangle.
Procedure 2:
  Operation is added to an area of a triangular.
Procedure 3:
  Operation is added to an area of an oval.
Here, "operation" is any operation such as fill in black, bit inversion, bit OR, etc.

If operation is first added to an area of a rectangle; operation is next added to an area of a triangular 62; and operation is finally added to an area of an oval 65, the positional relationship is as shown in FIG. 20. It is apparent by the human sense of sight that the rectangle 61 and the triangular 62 are overlapped with each other. The method of detecting the overlap is this example.

As already explained, in the process of translating the source codes described in the PDL for documents/graphic forms, the distributed processing interpreter according to the present invention once forms a file 10 of intermediate code form, records these in the main or auxiliary memory unit, and executes the actual distributed processing for converting these into picture elements with reference to this file of intermediate code form. Once the coordinates of the rectangle are known by analyzing these intermediate codes, the horizontal and vertical positional values of the coordinates of "left top end point" are substituted for the variable pair (GLTH[1], GLTV[1]), respectively. Further, the horizontal and vertical positional values of the coordinates of "right bottom end point" are substituted for the variable pair (GRBH[1], GRBV[1]), respectively. Here, the horizontal and vertical directions are determined as those obtained when the drawing (FIG. 19) is seen from front, and the positive signs thereof are determined by arrows in FIG. 19. Further, since there exist a plurality of graphic forms in a single page document, the variables GLTH, GLTV, GRBH and GRBV are all array variables. For example, GLTH[1] indicates the first element of an array of the variable GLTH. Next, three coordinates of the triangle 62 can be known, the maximum value Hmax in the horizontal direction, the minimum value Hmin in the horizontal direction, the maximum value Vmax in the vertical direction and the minimum value Vmin in the vertical direction can be detected on the basis of these coordinate values. This detection is equivalent to find a rectangle area 63 of the left top end coordinates (Hmin, Vmax) and the right bottom end coordinates (Hmax, Vmin). These operation is shown as step 67 in FIG. 21.

Then, the overlap between the two rectangles 61 and 63 is detected. First, control checks whether Vmax≧GRBV (in step 68). If the vertical top end position (Vmax) of the rectangle 63 is less than the vertical bottom end position (GRBV) of the rectangle 61, since the rectangle 63 is located below the rectangle 61, no overlap occurs (in step 75). If not so, control checks whether Vmax≦GLTV (in step 69). If NO and further Vmin>GLTV (NO in step 70), since the rectangle 63 is located above the rectangle 61, no overlap occurs (in step 75). In the case other than the above, control checks the horizontal positional relationship between the two rectangles. That is, control checks whether Hmin≦GRBH (in step 71). If NO, since the rectangle 63 is located above the rectangle 61, no overlap occurs (in step 75). If YES (in step 71), when Hmin<GLTH (NO in step 72) and Hmax<GLTH (NO in step 73), since the rectangle 63 is located on the left side of the rectangle 61, no overlap occurs (in step 75).

In the case other than the above, an overlap is detected (in step 74). In the case shown in FIG. 19, an overlap between the rectangle 61 and the triangle 62 can be detected. As a result, control determines that the rectangle 61 and the triangle 62 belong to "a single graphic form group".

Further, since the triangle 62 is added to "the graphic group 1" to which the rectangle 61 belongs, by the above determination, the area of "the graphic form group 1" must be updated as follows:
Procedure 1:
  Either smaller one of GLTH[1] or Hmin is substituted for variable GLTH[1].
Procedure 2:
  Either larger one of GLTH[1] or Vmax is substituted for variable GLTV[1].
Procedure 3:
  Either larger one of GRBH[1] or Hmax is substituted for variable GRBH[1].
Procedure 4:
  Either smaller one of GRBV[1] or Vmin is substituted for variable GRBV[1].

By the above-mentioned procedure, a new area of "the graphic form group 1" becomes a rectangle 64 as shown in FIG. 20. Here, operation is added to an oval 65. That is, since the respective coordinates of a rectangle 66 in which the oval 65 is inscribed can be obtained on the basis of the equation of the oval, the new values (Hmin, Vmax), (Hmax, Vmin) are substituted to determine the occurrence of overlap in accordance with the flowchart shown in FIG. 21. As a result, since it is determined that the area 66 is not overlapped with the area 64, it is known that the area 66 indicates a boundary of "a new graphic form group" including the oval 65. By determining this area 66 as graphic form group 2, the following four substitutions are executed:

GLTH[2]=Hmin
GLTV[2]=Vmax
GRBH[2]=Hmax
GRBV[2]=Vmin

The general document is more complicated in procedure. However, the procedure is quite the same as above.

Figure 22:
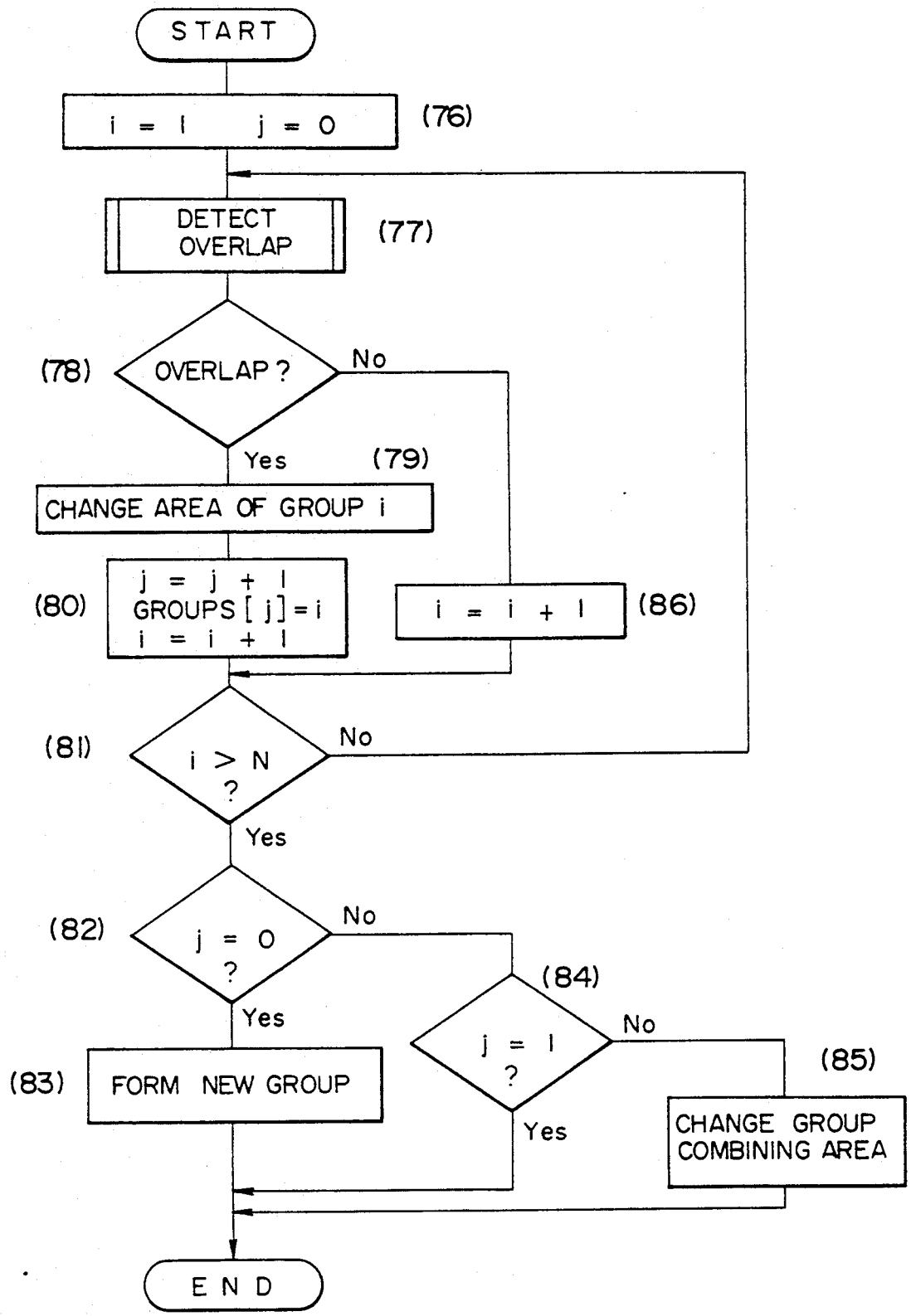
FIG. 22 is a flowchart showing the procedure of the discrimination and area coupling detection of graphic form group of the examples shown in FIGS. 19 and 20.

Prior to the start of the above-mentioned processing, since the source file describing a document is closed (i.e. the description is completed from the start page to the end page so that no additional description exists) and further the conversion into the intermediate codes is completed, the number of the graphic form elements/characters is finite. FIG. 22 shows a flowchart showing the procedure for determining how to handle the graphic form elements which are presented after the N-piece graphic form groups have been already detected. In FIG. 22, the variable i is an integer for counting the graphic form groups; variable j is an integer for indicating the number of graphic form groups in which graphic form elements to be noted are included; and the array variable Groups [j] is an integer array for recording the ordinal numbers of the graphic form groups in which graphic form elements to be noted are included.

First, control initializes i and j (in step 76), and calls the processing as shown by the flowchart of FIG. 21 as a subroutine to check overlap (in step 77). If no overlap (in step 78), i is incremented (in step 86). If the above processing is not executed to all the graphic form group (in step 81), the same overlap detection is repeated to the succeeding group (in step 77). On the other hand, if YES (in step 78), the area of the graphic form group i is updated in accordance with the following procedure (in step 79):

Procedure 1:
  Either smaller one of GLTH[i] or Hmin is substituted for variable GLTH[i].
Procedure 2:
  Either larger one of GLTV[i] or Vmax is substituted for variable GLTV[i].
Procedure 3:
  Either larger one of GRBH[i] or Hmax is substituted for variable GRBH[i].
Procedure 4:
  Either smaller one of GRBV[i] or Vmin is substituted for variable GRBV[i].

Further, the variable j for showing the number of times of detected overlaps is incremented; the graphic form group number (i) in which an overlap is detected is substituted for the array variable Groups [j] of the graphic form group; and i is incremented (in step 80).

Therefore, when a graphic form to be noted is overlapped with three (14th, 17th and 22nd) graphic form groups, an array as Groups [1]=14
Groups [2]=17
Groups [3]=22 can be obtained, where i=3.

When control determines that all the N-piece graphic form groups have been checked (in step 81), control checks whether j=0 (in step 82). If j=0, since there exists no overlap, the graphic form elements to be noted form a new graphic form group (in step 83). That is, the following five substitutions are executed:

N=N+1
GLTH[N]=Hmin
GLTV[N]=Vmax
GRBH[N]=Hmax
GRBV[N]=Vmin

If NO (in step 82), control checks whether j=1 (in step 84). If YES, since the group has already been updated in step 79, control ends without further execution.

Figure 23:
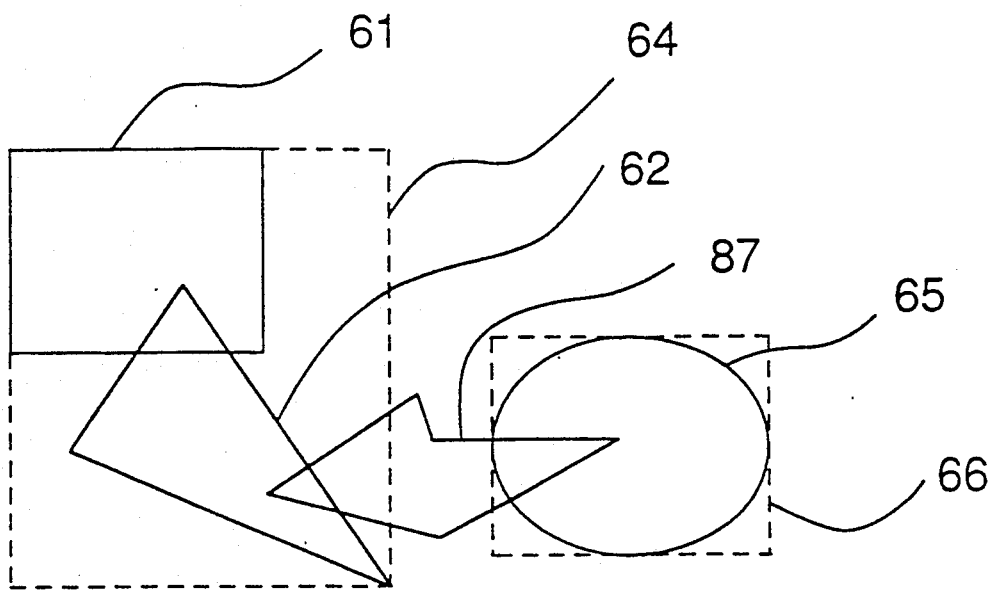
FIGS. 23 and 24 are illustrations for assistance in explaining the procedure of the area coupling detection between the graphic form groups shown in FIG. 22.

In the case other than the above, j is an integer indicative of 2 or more, that is, the graphic form to be noted is overlapped with two or more graphic form groups. In this case, it is necessary to combine graphic form groups and to set a new area (in step 85). This will be explained with reference to FIGS. 23 and 24. FIG. 23 shows the case where a polygon 87 now being noted is overlapped with two groups under the condition that a first graphic form group composed of graphic forms 61 and 62 and a second graphic form group of a graphic form 65 have already been detected. Therefore, in the flowchart shown in FIG. 22, at the stage before the step 85, j=2, Groups [1]=1, and Groups [2]=2. In step 85, a new graphic form group composed of the graphic forms 61, 62, 65 and 87 is formed and enclosed by dashed lines as a new rectangle area 88.

In more general, in the case where the graphic form elements now being processed is overlapped with "a graphic form group p" and "a graphic group q" (where p<q), the following procedure is executed in step 85.

Procedure 1:
  Either smaller one of GLTH[p], GLTH[q] or Hmin is substituted for variable GLTH[p].
Procedure 2:
  Either larger one of GLTV[p], GLTV[q] or Vmax is substituted for variable GLTV[p].
Procedure 3:
  Either larger one of GRBH[p], GRBH[q] or Hmax is substituted for variable GRBH[p].
Procedure 4:
  Either smaller one of GRBV[p], GRBV[q] or Vmin is substituted for variable GRBV[p].
Procedure 5:
  The following substitution is made.

$GLTH[q] = -32768$ $GLTV[q] = -32768$ $GRBH[q] = -32768$ $GRBV[q] = -32768$

Of course, the procedure is similar to the above when three or more graphic groups are combined. Further, the reason why a value of −32768 is substituted for the array element so far used by the graphic form group q is to inhibit the group from being overlapped with any graphic form in the subsequent processing. When new graphic form elements are generated, an array whose array element value is −32768 is detected as being out-of-use so that the array element value can be substituted to the same array. Further, in this case, it is of course unnecessary to update the integer N representative of the total number of the graphic forms.

As described above, the group division is completed to all the graphic form elements. The above can be applied to characters in the same way. Since the character area occupied as a graphic form is previously known on the basis of the shape and the number of points, a rectangle area which encloses these graphic forms is determined, and handled in quite the same way as other graphic form elements.

Figure 24:
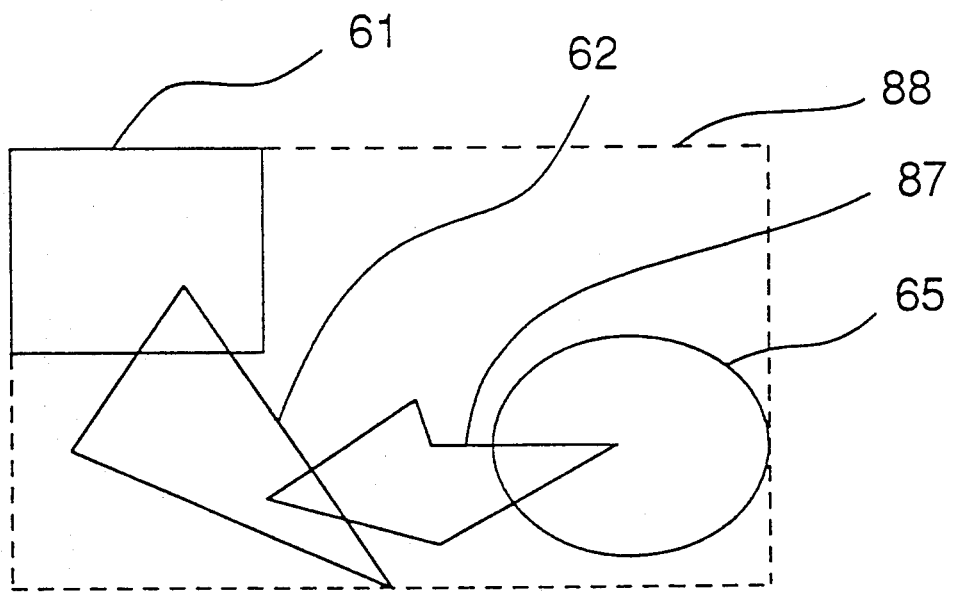

In the example of the group discrimination shown in FIG. 24, it seems that the graphic form group area 88 is excessively large as compared with the graphic form elements included therein. In practice, however, since the respective detected graphic form groups are processed by the black filling algorithm of the distributed processing interpreter being operated in each different process, respectively, and further filled in black by filling means for scanning in the horizontal direction as already described, the filling processing is not delayed in particular. Further, the bit operation such as bit inversion is not also delayed in particular.

(2) Example 2 of group discrimination

Another example of group discrimination will be explained hereinbelow with reference to FIGS. 25 and 26, in which the solid lines 89 denotes a printing paper area, and the dashed lines 90 denotes a plurality of small printable divided into 11 areas in the vertical direction and 8 areas in the horizontal direction. The small areas divided independently can be designated unconditionally by a value r defined as follows: an of i-th column and j-th row is represented by R(i, j) and a successive value $r=(j-1) \times 8+i$ indicates an area R(i, j).

Figure 25:
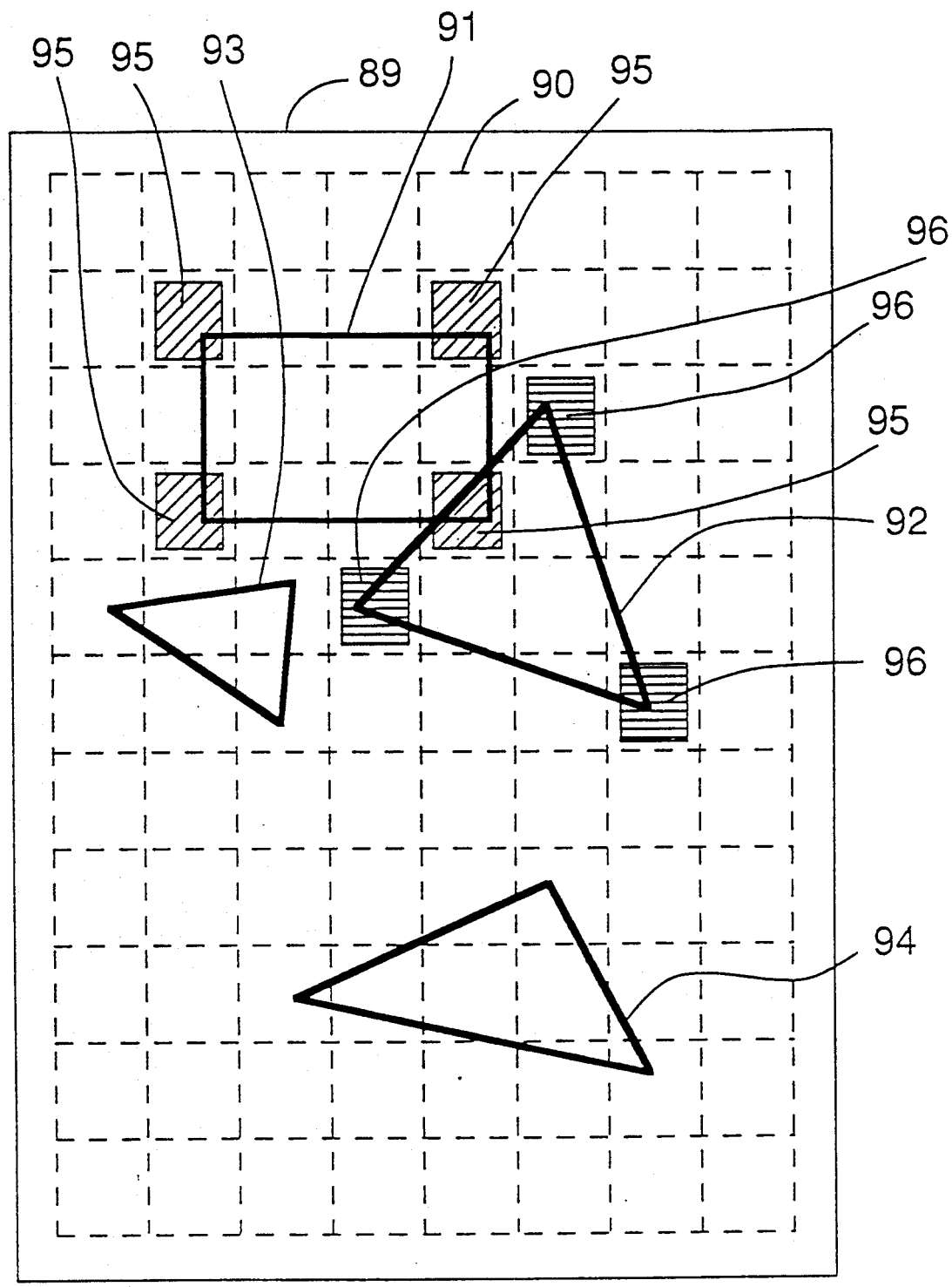
FIG. 25 is an illustration for assistance in explaining the second method of detecting a graphic form group.
Figure 26:
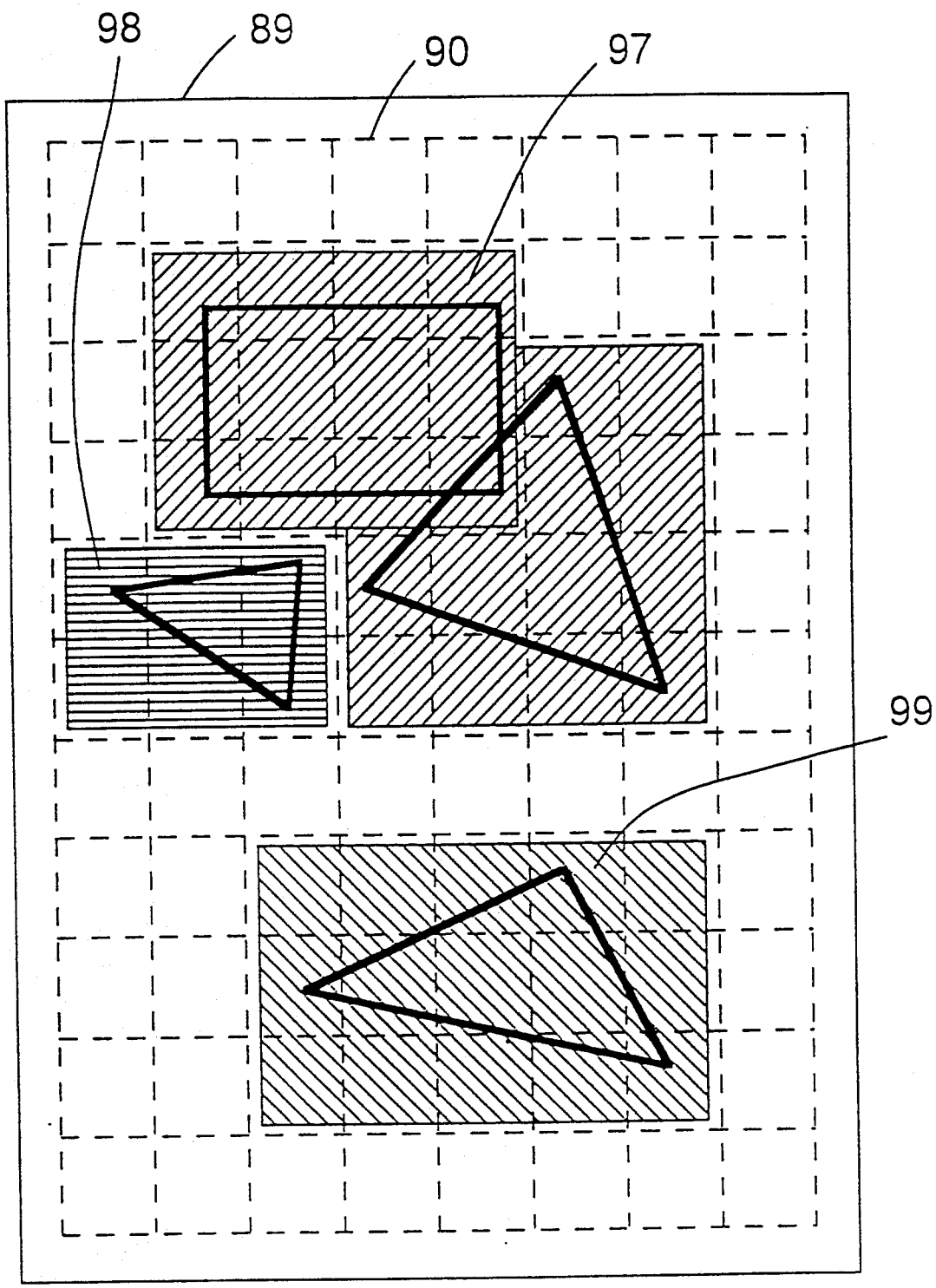
FIG. 26 is an illustration for assistance in explaining the graphic form groups detected by the method shown in FIG. 25.

In FIG. 25, there are four graphic form elements 91, 92, 93 and 94 on a printing area, and the rectangle 91 and the triangle 92 are overlapped with each other. Therefore, it is regarded that the graphic form elements 91 and 92 belongs to the same graphic form group. In this example, the small areas (divided by the dashed lines 90) at which the coordinates of boundaries of a graphic element to be noted are included are detected. If the left bottom corner point of the printable area is determined as a coordinate origin; and the horizontal rightward and vertical upward directions are determined as being positive, the left top end coordinates of an area R(i, j) is represented by $$GLTH[r] = (i-1) \cdot h$$

$$GLTV[r] = j \cdot v$$

and the right bottom coordinates thereof is represented by $$GRBH[r] = i \cdot h$$

$$GRBV[r] = (j-1) \cdot v$$

where h, v are constants determined by the resolutions in the horizontal and vertical directions, respectively. For instance, if the printable area in the horizontal direction is 8 inches; the printable area in the vertical direction is 11 inches; and the resolutions of printed picture elements are both 300 elements per inch, $h = 300 \times 8$ inch/8 div = 300 and $v = 300 \times 11$ inch/11 div = 300. Further, r denotes the afore-mentioned index. Here, if the coordinates of one of corner points of the boundaries of a graphic form element now being noted is (x, y), it is necessary to check only whether $$GLTH[r] \leq x \leq GRBH[r] \text{ and}$$

$$GRBV[r] \leq y \leq GLTV[r]$$

in sequence from r=1 to r=88.

As a result, it is checked that four coordinates of the area 91 are included in four oblique shaded areas 95 and three coordinates of the area 92 are included in three horizontal shaded areas 96. For instance, here the areas 96 are three of R(7, 6), R(4, 7) and R(6, 9).

Subsequently, the horizontal minimum and maximum values and the vertical minimum and maximum values of these area indices are obtained. In the case of the area 96, these values are 4, 7, 6 and 9. Further, all the areas within which these indices are included are extracted as R(4, 6), R(5, 6), R(6, 6), R(7, 6), R(4, 7), R(5, 7), R(6, 7), R(7, 7), R(4, 8), R(5, 8), R(6, 8), R(7, 8), R(4, 9), R(5, 9), R(6, 9), R(7, 9). If the index r is used, these areas can be represented by a set of {r|44, 45, 46, 47, 52, 53, 54, 55, 60, 61, 62, 63, 68, 69, 70, 71}

The above areas are obtained for all the graphic form elements, and recorded as an array for each graphic element. With respect to characters, a division composed of a plurality of character strings is regarded as one graphic form element, without regarding a single character as a single graphic form element.

As a result, in the case of the graphic form elements 91 and 92, it is known that the index values r are common at r=60, r=61, r=68 and r=69. That is, it is determined that these two graphic form elements 91 and 92 are overlapped with each other. Therefore, a sum-set of all the areas is produced with reference to the already-recorded arrays, so that an area group as shown by an oblique dashed portion 97 in FIG. 26 can be obtained. In other words, the oblique shaded portion 97 is a graphic form group including both the graphic form elements 91 and 92. In the same way, the other graphic groups as the areas 98 and 99 can be detected.

The above general procedure can be described as follows:

Procedure 1:
    Areas at which coordinates for determining polygon boundaries are included are obtained for each graphic form element i as R(H1, V1), R(H2, V2), ... R(Hn, Vn)

Procedure 2:
    Maximum and minimum values Hmin and Hmax are obtained from the above H1 to Hn. Maximum and minimum values Vmin and Vmax are obtained from V1 to Vn.

Procedure 3:
    Indices r are obtained of all the areas R(i, j) included in a rectangular area whose left bottom corner is an area R(Hmin, Vmin) and whose right top corner is an area R(Hmax, Vmax) and an array Unit[i, r] for each graphic element i is recorded. If the array element is 1/0, substitutions are executed as Unit[i, 61]=1, Unit[i, 62]=0, for example.

Procedure 4:
    Procedures 1 to 3 above are repeated for each graphic element.

Procedure 5:

Overlaps of all the arrays obtained in Procedure 3 above are detected, and a logical sum of arrays where at least one overlap is detected is obtained.

Procedure 6:
  Arrays overlapped in Procedure 5 above are deleted and the remaining arrays are adopted as a set of areas R(i, j) for determining a graphic form group including graphic form elements.

The group discrimination is made in accordance with the above-mentioned procedure. This method is more suitable for distributed processing, because it is possible to discriminate as a different group the graphic forms such as the area groups 97 and 98 shown in FIG. 26 (which are discriminated as the same graphic group in accordance with the first example).

(3) Examples 3 of group discrimination

The third example will be described with reference to FIG. 27. In general documents, a series of characters or graphic forms are arranged in the horizontal direction. Therefore, it is practically possible to simply divide the document into a plurality of oblong areas, without dividing it in both the horizontal and vertical directions as explained before. This simpler method is rather advantageous from the standpoint of execution speed.

Figure 27:
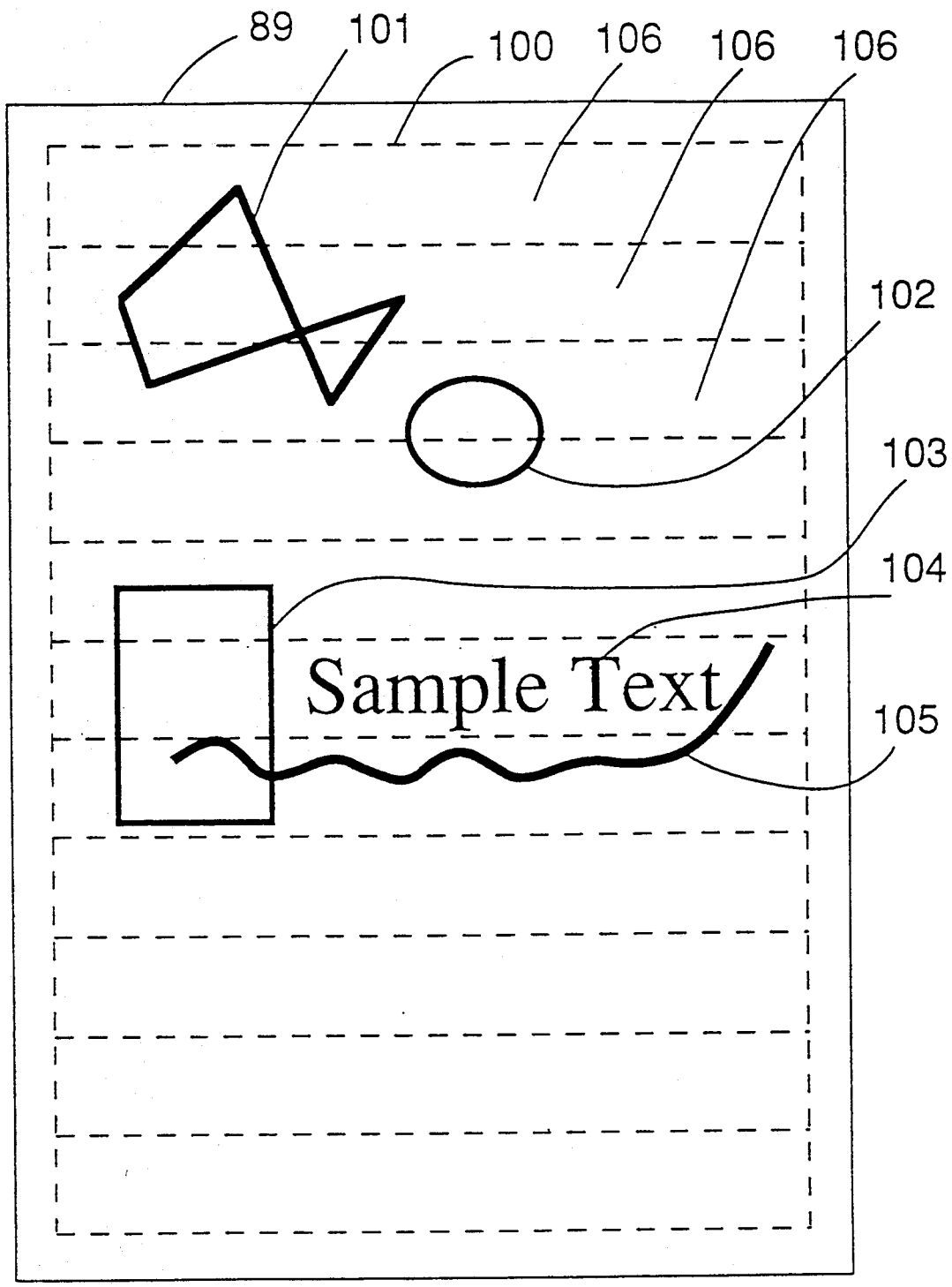
FIG. 27 is an illustration for assistance in explaining the third method of detecting the graphic form group.

In FIG. 27, the solid lines 89 show a printing paper area; the dashed lines 100 show the boundaries obtained when the printable area is divided into 11 divisions in the vertical direction; and the reference numeral 106 denotes the respective divided areas. A coordinate system is set such that the left bottom corner point of the printable area is determined as a coordinate origin; the horizontal rightward direction is determined as being positive; and the vertical upward direction is determined as being positive. If one area is represented by R(i), the coordinates of the left top end of this area R(i) are (0, i·v) and the coordinates of the right bottom end thereof are (W·h, (i−1)·v) where W denotes the width of the printing area; h denotes a printing density (unit: picture elements per inch); and v denotes printing density × print area height/number of divisions.

The procedure of group discrimination is as follows:

Procedure 1:
  An area R(i) in which coordinates for determining the boundaries of the graphic form element to be noted are included is obtained. An index i is written in an array Unit[j, i] given for each graphic form element. Since $1 \leq i \leq 11$, the total number of the graphic form elements is determined 32767 or less, so that the two dimensional array unit is not extraordinarily large in number.

Procedure 2:
  Procedure 1 above is repeated to all the graphic form elements.

Procedure 3:
  Overlaps of all the arrays formed by Procedures 1 and 2 are detected and a logical sum of arrays in which at least one overlap is detected is obtained.

Procedure 4:
  Arrays overlapped in Procedure 3 are deleted and the remaining arrays are adopted as a set of areas R(i) for determining a graphic form group including graphic form elements.

The procedure will be explained by taking the case of graphic form elements 101, 102, 103, 104 and 105 shown in FIG. 27. If the graphic form elements from 101 to 105 are denoted by graphic form element indices 1 to 5, the following results can be obtained as Unit[1, 9]=1, Unit[1, 10]=1, Unit[1, 11]=1,
Unit[1, 1]=0, Unit[1, 2]=0,,, Unit[1, 8]=0
Unit[2, 8]=1, Unit[2, 9]=1, Unit[2, 1]=0,,,
Unit[2, 10]=0, Unit[2, 11]=0

Since the overlap between the two graphic form elements 101 and 102 can be detected by Procedure 3, these elements are determined as the same graphic form group, so that the areas R(11), R(10), R(9) and R(8) are determined as a single graphic form group area. In the same way, the graphic form elements 103, 104 and 105 are detected as the same graphic form group.

In the above group detection method, since the graphic form elements (such as the elements 101 and 102) not actually overlapped with each other (so that the distributed processing is possible) are recognized as if these belong to the same graphic form group, although the processing is redundant, this method can be executed simply.

As explained above of the three examples, it is possible to find graphic form groups not mutually overlapped with each other and to divide the graphic forms into graphic form groups. In practice, when the graphic form groups are detected in a document (including characters and graphic forms) prepared by various application software, the number of detected groups ranges from several to several hundreds, and seldom exceeds 1000 (where the characters are grouped as character strings as much as possible, as far as the characters in the same row are of the same character style). In practical cases, the number of the computers usable for distributed processing is three and the number of the graphic form groups is 400. Further, where the computer is provided with sufficient processing capability, it is unnecessary to limit the number of processes to be formed for distributed processing only to one process. In any cases, the number of detected graphic form groups does not match that of processes used in the present invention. Further, it is apparently not preferable that the computer for sharing part of the distributed processing participates to a heavy load processing for many seconds, because there exists such a case that even if the processor load is light accidentally at the time when a request is generated, a heavy load processing request is often generated in a subsequent moment. One of the better methods of overcoming this problem is to allow the processor to process as small a part of processing as possible and to recheck the load of the processor whenever the processing has been completed. To realize this method, the PDL parallel processing interpreter according to the present invention adopts the table control as follows: In the PDL parallel processing interpreter according to the present invention, a graphic form group control table 3 as shown below is formed on a memory area held by the client process, to control the printing operation until all the printing operation for one page has been completed. As already explained with reference to FIG. 4, the group detection processing 216 and the image synthesize processing 220 refer to the group control table 217 whenever the client process 210 is executed.

TABLE 3

| Graphic form group | Graphic form group area | Processing status | Destination |
|---|---|---|---|
| 1 | GLTH[1], GLTV[1], GRBH[1], GRBV[1] | −1, −1 | 6a |
| 2 | GLTH[2], GLTV[2], GRBH[2], GRBV[2] | 100, 140 | 6b |
| 3 | | 0, 0 | 6b |

TABLE 3-continued

| Graphic form group | Graphic form group area | Processing status | Destination |
|---|---|---|---|
| N | GLTH[N], GLTV[N], GRBH[N], GRBV[N] | −1, −1 | 6a |

This graphic form group control table is composed of the following four members.

(1) Index to graphic form group:
Integers from 1 to 512

(2) Area occupied by graphic form group on a printing paper:
A set of four integers. The area is all determined as a rectangle designated by a 16-bit length, respectively in the order of the left top end horizontal coordinates (GLTH[i]), the left top end vertical coordinates (GLTV[i]), the right bottom end horizontal coordinates (GRBH[i]), and the right bottom end vertical coordinates (GRBV[i]).

(3) Processing status:
A two-integer set of (−1, −1) indicates that the processing is not yet executed, and that of (0, 0) indicates that the processing has been completed and further transferred to the client process. The set of positive integers indicates that the first number is always less than the second number and further the vertical coordinates have been already converted into picture elements from "the first number position" to "the second number position".

(4) Network identifier of a computer to which transferred:
A character string with a length determined by the operating system.

In the case of the group discrimination example 2, the graphic group area is not necessarily a rectangle. In this example 3, the graphic form group is controlled under control table as a rectangular area determined by the maximum and minimum horizontal/vertical positions.

Figure 28:
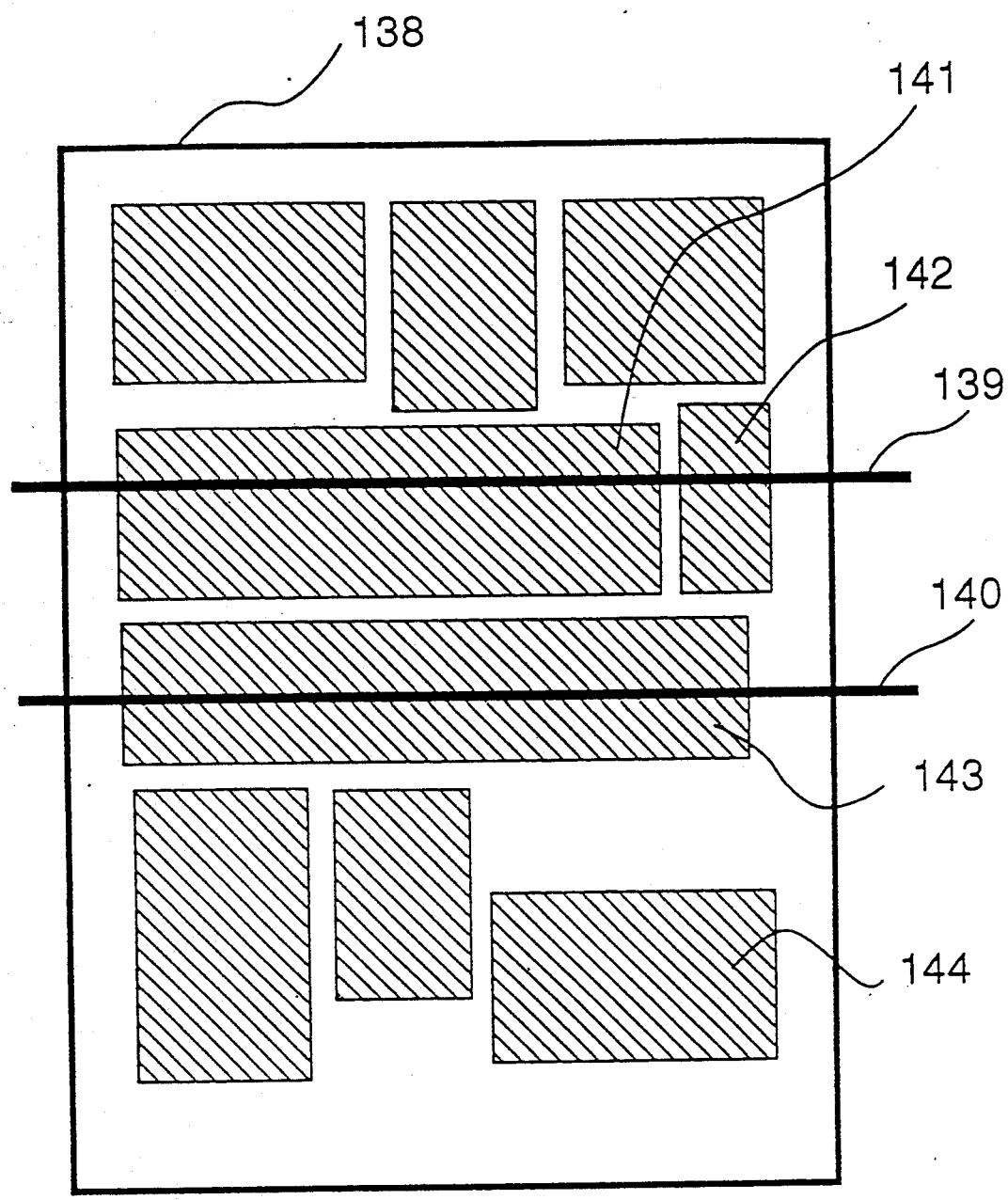
FIG. 28 is an illustration for assistance in explaining the printing procedure.

The practical method of controlling the graphic form group by use of the graphic form group control table will be described hereinbelow with reference to FIG. 28.

Figure 29:
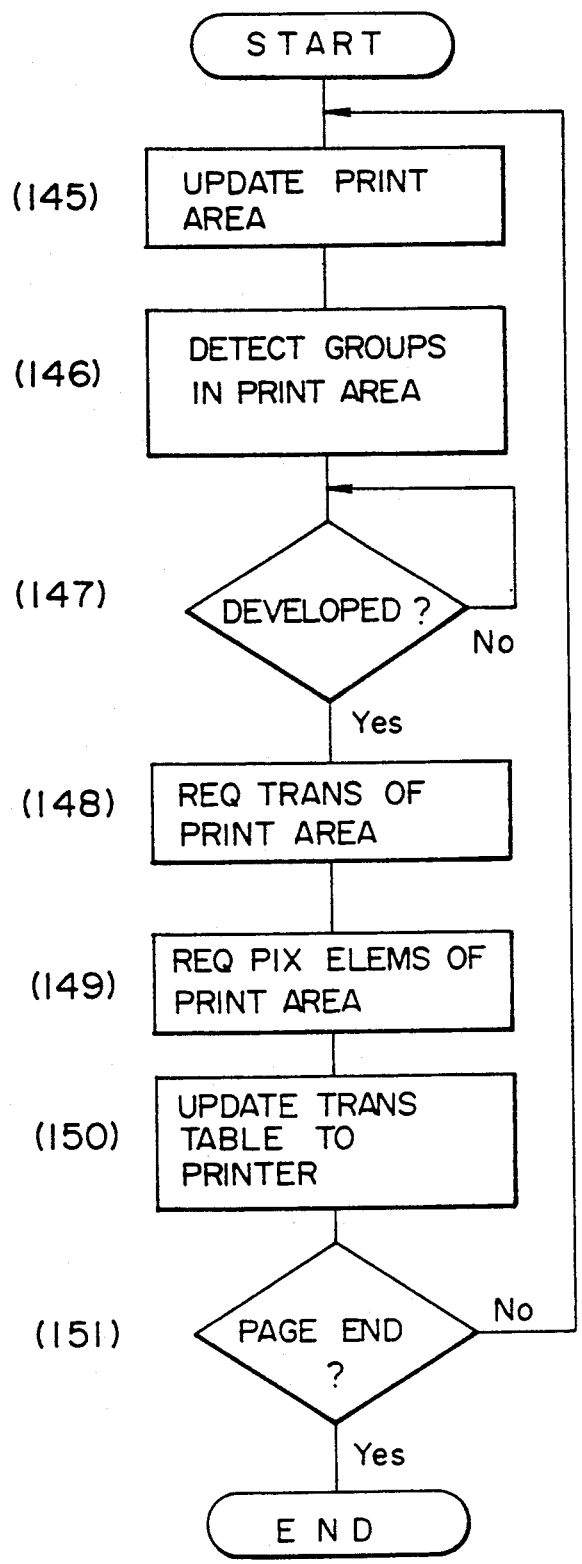
FIG. 29 is a flowchart showing the printing procedure.

In the drawing, there are graphic form group areas 141, 142, 143, 144, etc. as shown by shaded portions on a printing paper area 138. It is generally preferable to print along a beltlike rectangular perpendicular to the paper feed direction of the printing unit. In FIG. 28, for instance, it is preferable to print for each area sandwiched between two straight lines 139 and 140. Although being dependent upon the printing method of the printing unit, the operation is the simplest when the printing unit is provided with a memory area for developing and holding at a time all the picture elements required all over a printing paper. However, when only a part of the necessary memory is mounted on the printing unit for cost reduction, printing is made division by division. In this case, therefore, it is required that the client process arranges all the picture elements of the part to be currently printed by the printing unit into a beltlike form, before transferring the picture elements to the printing unit. Now, when the area between the two straight lines 139 and 140 is required to be printed, the client process checks the conversion status into picture elements for each graphic form group 141, 142 or 143 on the basis of the table formed on the memory in accordance with the specifications shown in table 3. If the vertical coordinate value of the straight line 139 is 1200 and that of the straight line 140 is 1500, the conversion into picture elements of the graphic form group 143 must be completed up to at least the vertical coordinate value of 1500. This value can be known on the basis of the third member listed in Table 3. Further, the client process must execute at least two processes of "transfer of picture elements to the printing unit" and "update of Table" simultaneously (for parallel processing). FIG. 29 shows the flowchart of the former process and FIG. 30 shows the flowchart of the later process.

The above two processes will be described hereinbelow. First, control sets a beltlike printing area (in step 145). This printing area is the one sandwiched between the two straight lines 139 and 140 in FIG. 28, for instance. Subsequently, control checks graphic form groups included in the above printing area on the basis of the second member of the group control table 3 (in step 146). In this step, control checks whether all the graphic form groups have been developed in the area to be printed. If the third member of the group control table 3 is not a negative number or not zero, this indicates that the graphic form groups are now being developed, and control checks whether the development proceeds beyond the area to be printed on the basis of this third member. In the case shown in FIG. 28, the development of the graphic form groups 141 and 142 must be completed and additionally the processing of the graphic form group 143 must proceed to 1500 in the vertical direction. If all the graphic groups have been developed in the area to be printed (in step 147), control transmits a transfer request for a printing area to the server process (in step 148). In this case, control requests the server process to transfer picture elements for only the area necessary for printing, not for all the areas of the graphic form group, and receives the transferred picture elements (in step 149). The received picture elements are transferred to the printing unit. When all the areas of the graphic form group have been printed, the third member of the group control table 3 is set to zero with respect to the already-printed group (in step 150). The same processing is repeated by updating the printing area until the one page has been printed (in step 151).

Figure 30:
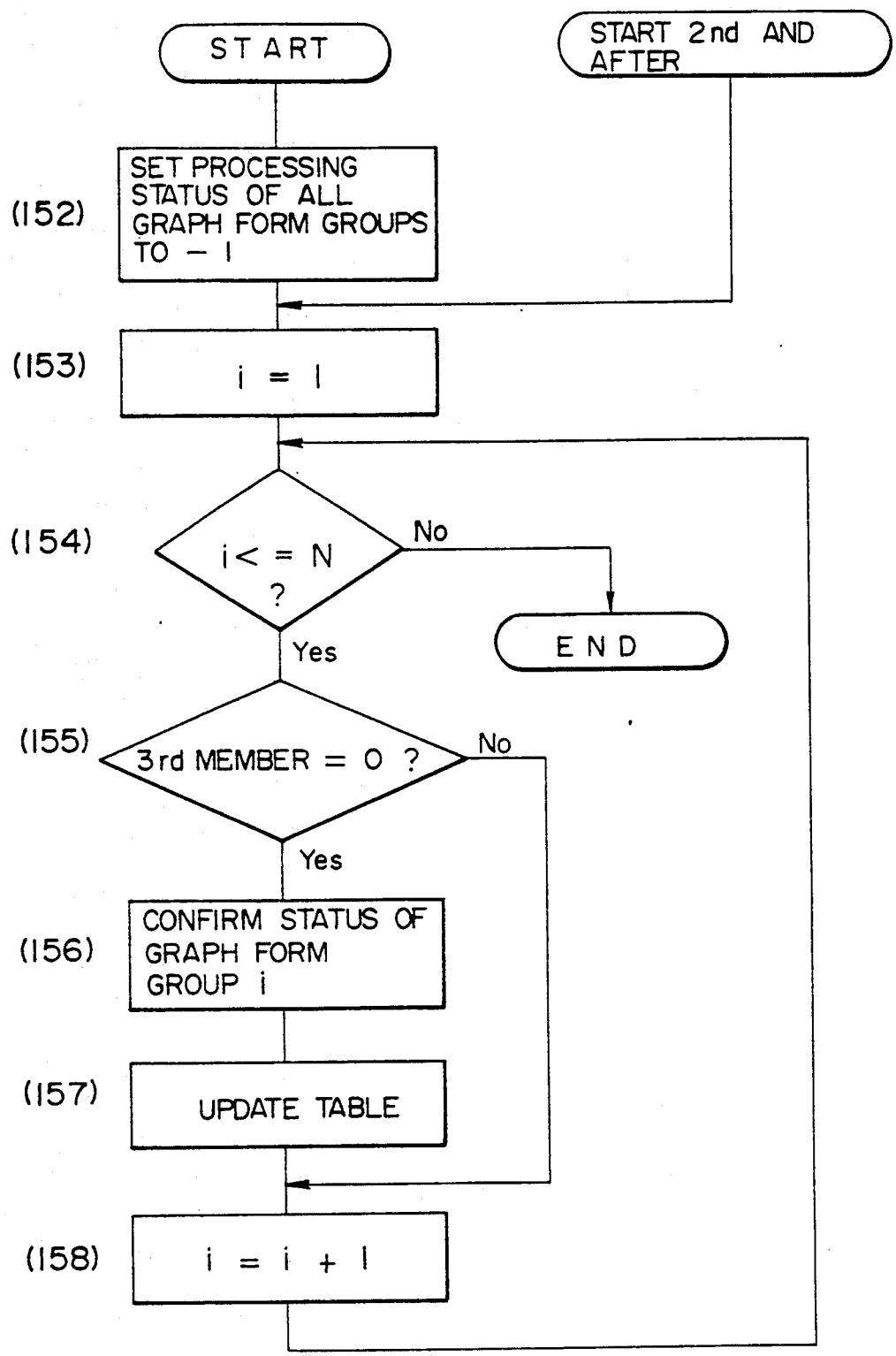
FIG. 30 is a flowchart showing the interpretation processing procedure.

In parallel with this processing, the group control table is updated under control of the client process in accordance with the procedure shown in FIG. 30. Control first sets the processing status of all the graphic form groups to −1 for initialization (in step 152). Further, the index i indicative of the graphic form group is initialized (in step 153). Subsequently, the computer identifier in charge of the development of the graphic form group i is obtained on the network on the basis of the fourth member of the group control table 3, and a message for status request is transmitted thereto to check the conversion status of the picture elements of the graphic form group i (in step 156). Control updates the table 3 on the basis of the status (in step 157), proceeding to the succeeding graphic form group (in step 158). When the same check has been completed for all the graphic form groups (in step 154), the processing once ends. After a predetermined unit time has elapsed, control restarts the processing beginning from the step 153. Since the graphic form group already printed during this time duration can be detected because the third member is (0, 0) (in step 155), no message is transmitted/received. The same procedure is executed for the other graphic form groups to check the development status into picture elements (in step 156) and the table 3 is updated (in step 157).

The present invention controls the progressing status of the distributed processing by operating the group control table as described above.

The second embodiment of the PDL parallel processing interpreter according to the present invention will be described hereinbelow.

As already explained in the first embodiment, the executable processing of the distributed processing interpreter according to the present invention can be divided roughly into two as follows:

(A) Dividable graphic form groups are detected, so that the results will not be different from those processed by a single translation system, even if the PDL source file is divided for distributed processing. Further, the divided codes are transmitted to other information processing units.

(B) The PDL source file is translated actually and replaced with printable picture elements.

Figure 31:
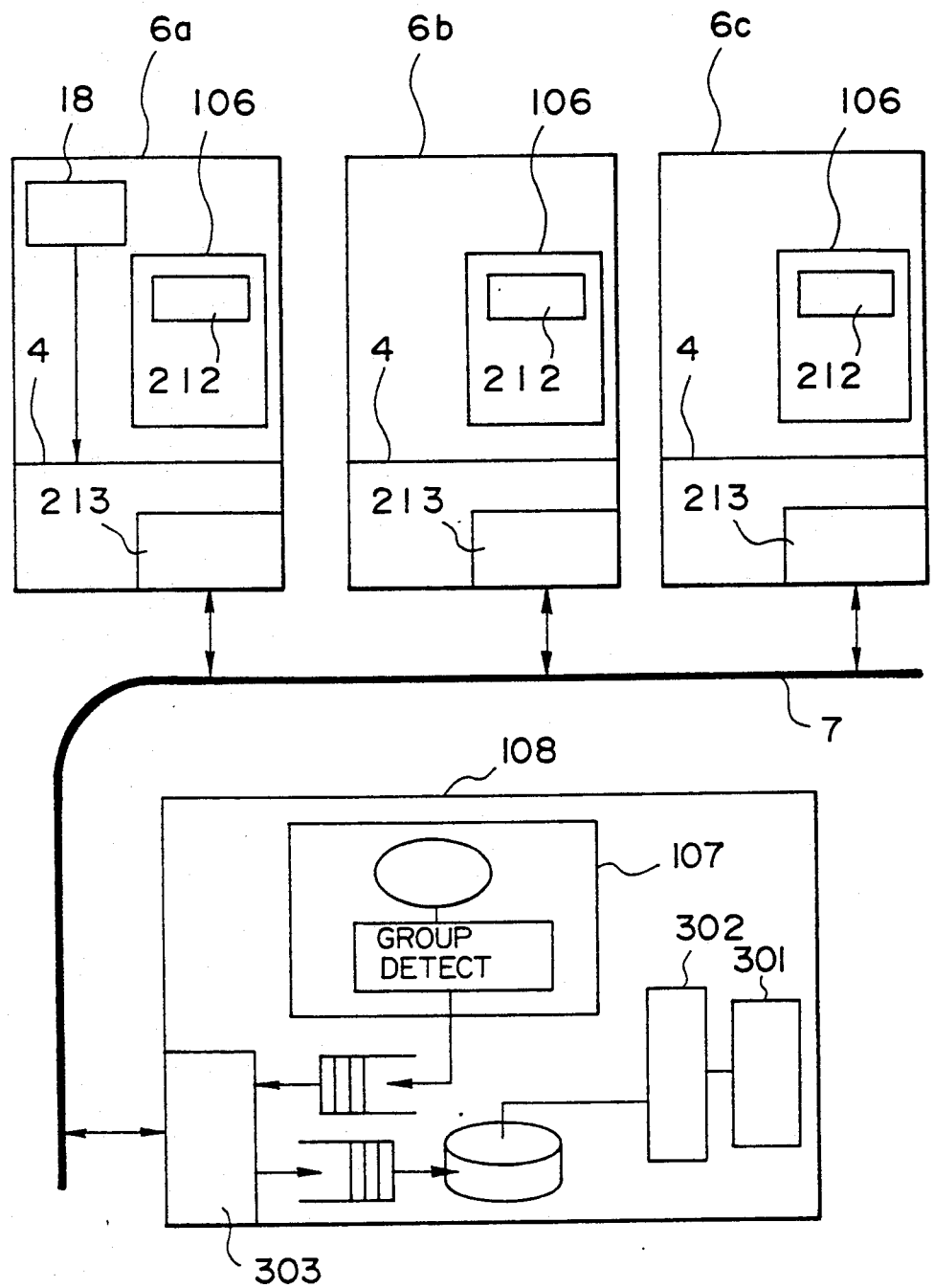
FIG. 31 is a block diagram showing the second embodiment configuration according to the present invention.

In the first embodiment, one processing system can execute both the above functions (A) and (B), and the functions are used properly according to the role of a server or a client. However, it is of course possible to construct the distributed processing system composed of a plurality of programs whose functions are always fixed, as in the case of this second embodiment. This embodiment will be described hereinbelow with reference to FIG. 31.

In this embodiment, a printing unit 108 is provided with a resident program 107 for executing the above processing (A), and computers 6a, 6b and 6c connected by a network 7 is provided with a program 106 for executing the above processing (B). The case is considered where a printing request is generated by application software executed by any one of the computers 6a, 6b and 6c. Here, the assumption is made that the user operating the application software (e.g. word processor) executed by the computer 6a requests a printing processing.

Figure 32:
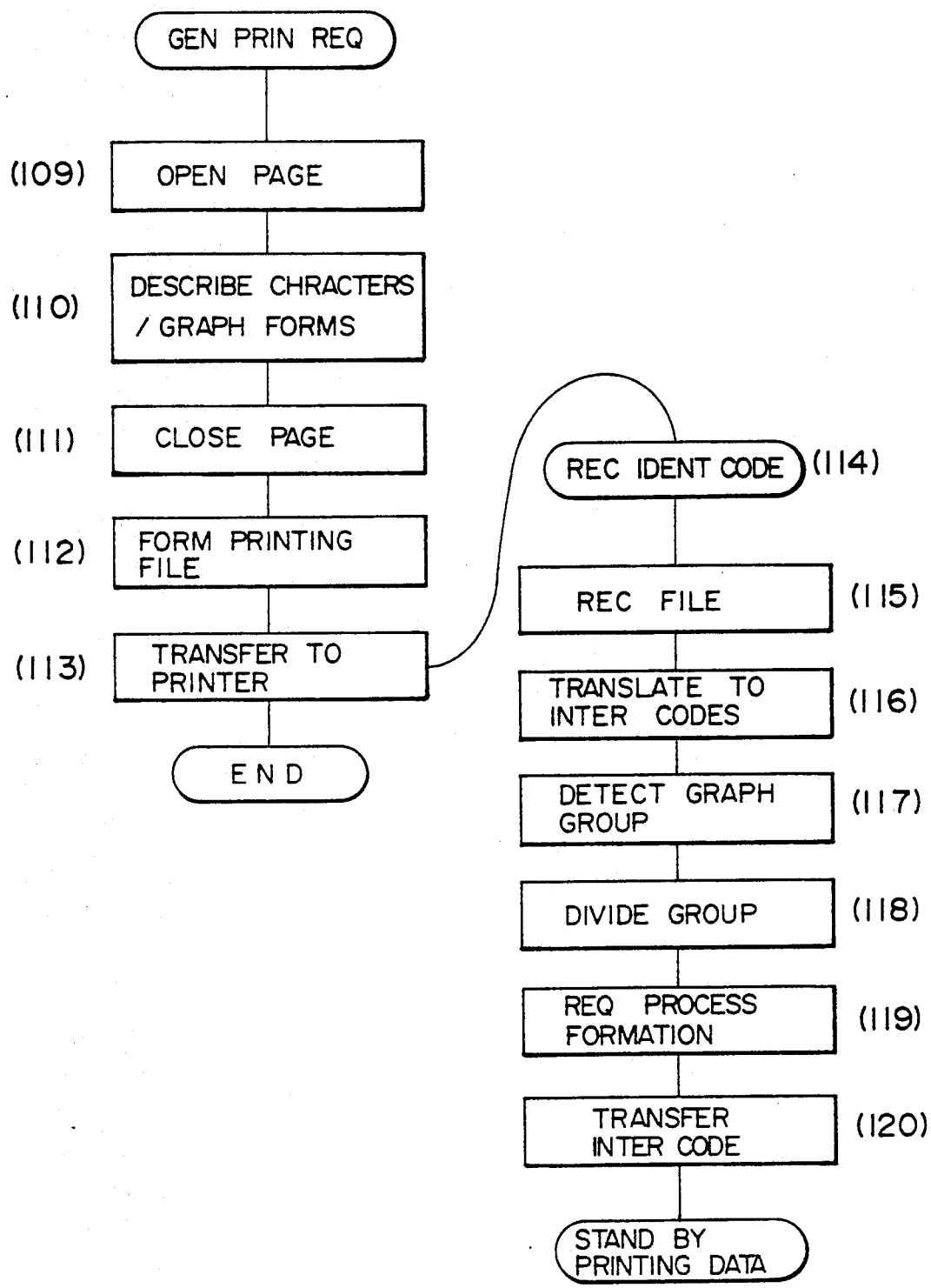
FIGS. 32 and 33 are flowcharts showing the operation of the second embodiment.

With reference to a flowchart shown in FIG. 32, the application software for requesting the printing processing opens pages from among a plurality of pages (there exists the case of a single page, of course) to be printed, in order to print pages now being processed (in step 109). In other words, control secures a memory area necessary for the printing processing in either of the main memory unit or the auxiliary memory unit, prepares necessary data such as font information, and actually describes graphic form elements such as characters and graphic forms in accordance with the PDL specifications (in step 110). When the above writing processing has been completed for all the pages to be printed, control closes the page (in step 111). In other words, after a page end symbol has been written, control inhibits other information data from being written in the memory area already secured in step 109. Here, when the writing processing in step 110 has been executed by the main memory unit, the written information is rewritten in a file. Where the writing processing has been executed by the auxiliary memory unit, a printing file is formed by adding an appropriate identifier at the head of the file (in step 112). Further, the file is transferred to the printing unit 108 (in step 113) to complete the printing processing for one page. Subsequently, the application software executes the succeeding page printing processing or another processing.

The following processing is executed by a program 107 loaded in the printing unit 108. There are two cases where the printing unit 108 receives the PDL source file or picture element data to be printed. Here, the former case will be explained hereinbelow. Control first receives an identifier code (in step 114) and discriminates it. Subsequently, control receives a source file described in the PDL (in step 115), and translates it into an intermediate code format suitable for processing (in step 116). In practice, control rearranges a source code described in the form of a character code string such as Procedure FillPolygon (PolygonA) into an operator of a 16-bit length and an operand of a 32-bit length, for instance such as FillPolygon=$C044, InvertPolygon=$C084. However, the bit length and the code format of the intermediate code can be of course selected according to the processing system.

Thereafter, control detects non-dividable graphic form groups which cannot be distributed in accordance with the already-explained methods or the methods similar thereto (in step 117), and divides the intermediate code file into graphic form groups (in step 118). Even if the respective graphic form groups divided at this stage are processed perfectly independently and thereafter overlapped with each other in any given order, it is possible to obtain a correct printing result. Subsequently, a process formation is requested to other information processing units (mainly microcomputers) connected by the network (in step 119), and the intermediate-coded graphic form groups are transmitted to the units which responds to the request (in step 120). The transfer is executed in accordance with the procedure of scheduling. Thereafter, the program 107 of the printing unit 108 stands by the reception of printing data.

On the other hand, in response to the process formation request in step 119, the respective programs 106 of the computers 6a, 6b and 6c become operative. The program 106 is provided with a resident portion and a non-resident portion. The resident portion always detects the requests generated on the network, and the non-resident portion is controlled as a program unit (process) called (after a memory area has been secured) and executed only when necessary.

Figure 33:
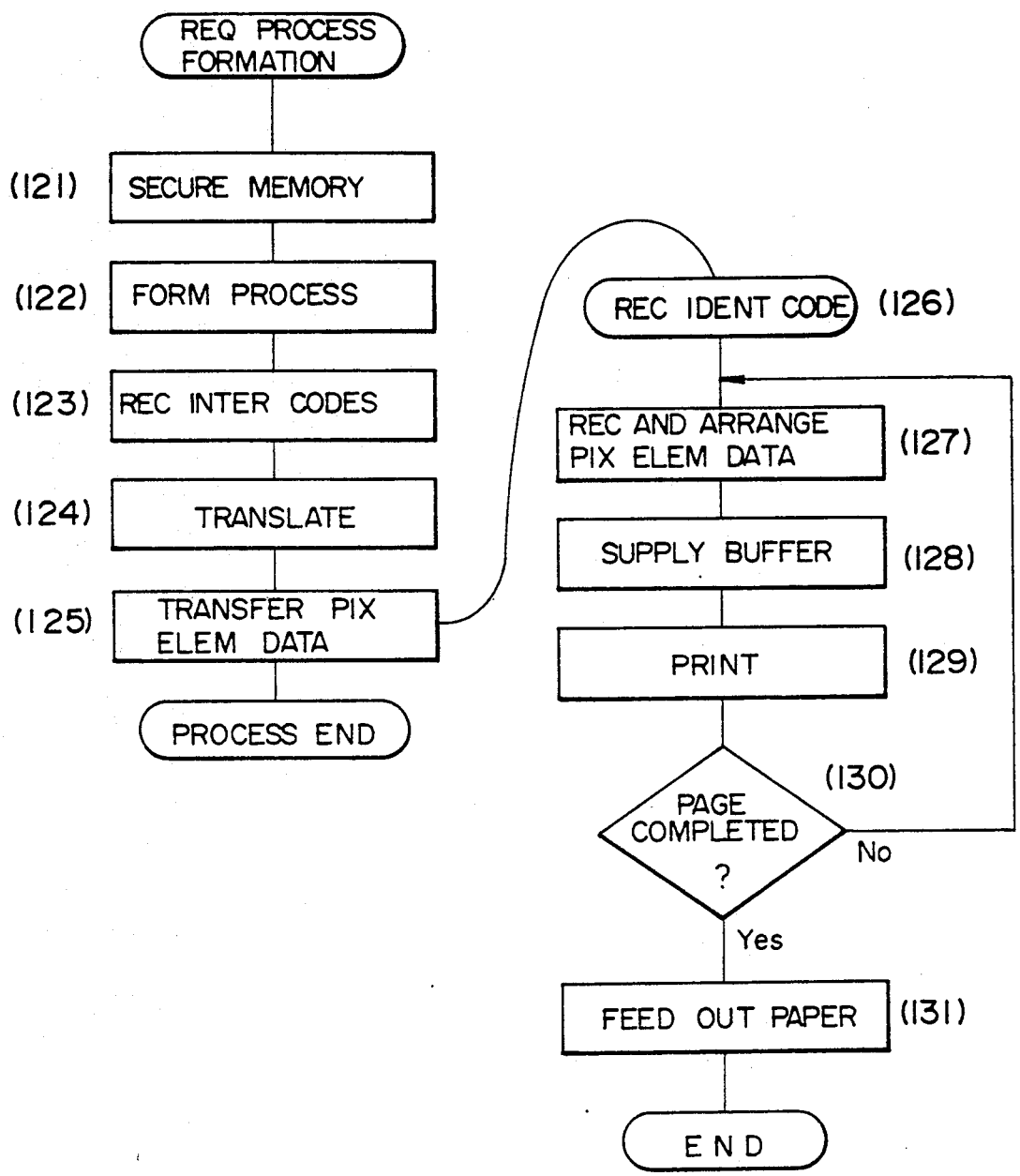

FIG. 33 shows a flowchart of the programs 106 and 107. The resident portion of the program 106 which receives a process formation request first secures a memory area (in step 121). If possible, the non-resident portion is read into a portion of the memory area to form a process (in step 122). The formed process receives the intermediate codes transmitted from the program 106 of the printing unit 108 (in step 123), and translates them into actual printing picture elements (in step 124). The procedure of forming the printing picture elements is the same as with the case of the first embodiment. Since the quantity of translation is merely a portion of the description for one page, the memory area used for development and the execution time can be both reduced. The formed picture elements are transferred again to the program 107 of the printing unit 108 (in step 125).

The program 107 recognizes the received picture element data as a picture element string on the basis of the identifier code (in step 126), and rearranges the received picture element data in the printing buffer area (in step 127). If the buffer area is completed, printing is executed (in step 129). In case the data stored in the buffer are less than all the data for one page, the above processing is repeated until all the data for one page have been printed (in step 130). After one page has been printed, the printed page is fed out (in step 131), thus completing the one-page printing processing.

There are some cases where the above procedure differs according to the printing method of the printing unit. As is well known, in the case of the electrophotographic printer, it is usually impossible to interrupt the process from the start of a series of printing process to the end thereof. By the current technology, it is difficult to continuously transfer data from the network according to the progress of the printing process. In this case, therefore, it is necessary to secure the memory area required for one-page data in steps 127 and 128. However, in the case where a serial printer is used for the above procedure, since it is possible to interrupt the printing process at any time point during printing operation, the buffer area for one-page data is not necessarily required. The above-mentioned restriction is mainly dependent upon the physical restriction of the printing unit, and the hardware restriction such that how large capacitance of memory can be mounted as the buffer area does not restrict the distributed processing. The present invention can be applied to any cases.

The third embodiment of the present invention will be described hereinbelow.

Figure 34:
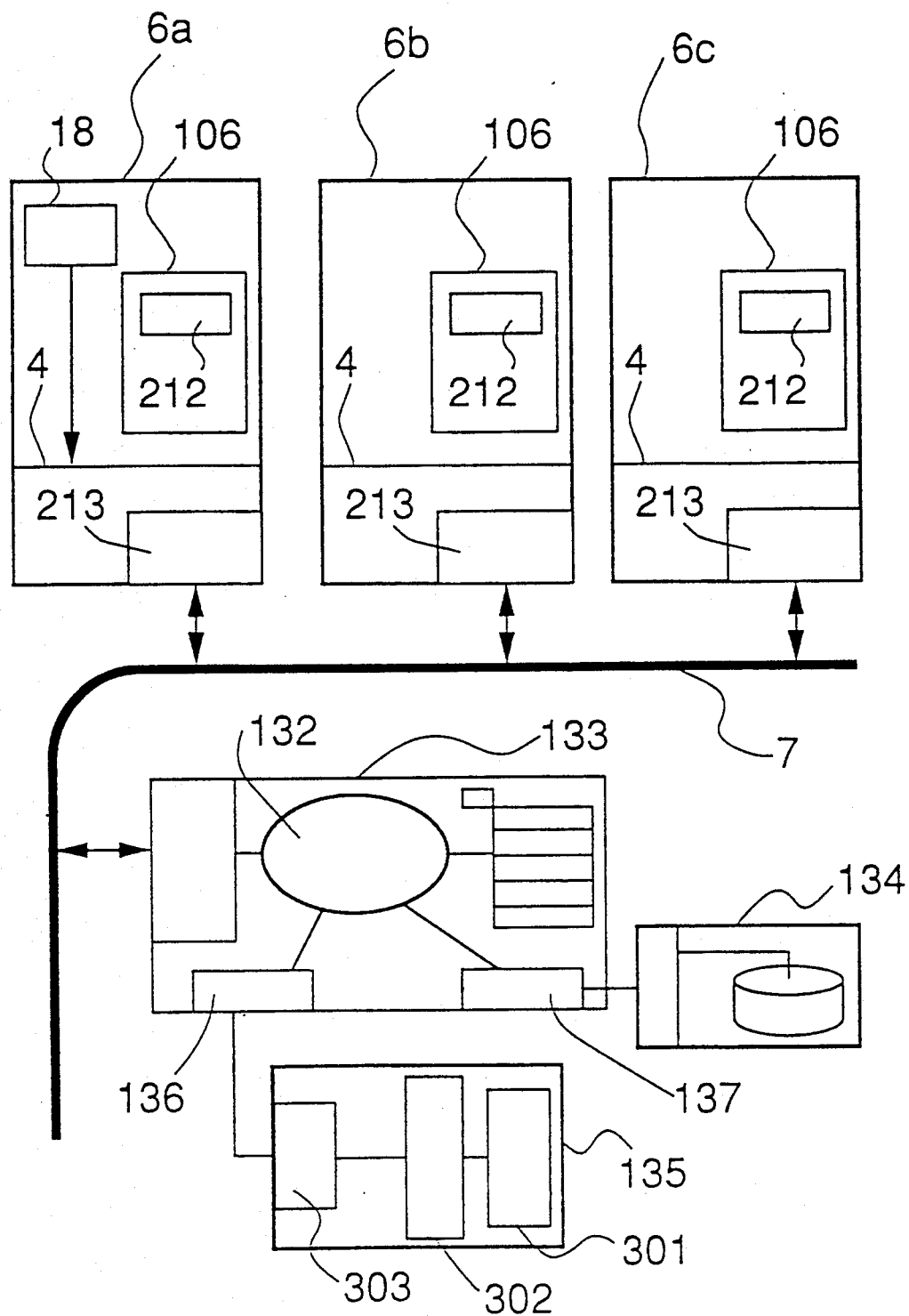
FIG. 34 is a block diagram showing the third embodiment configuration according to the present invention.

The memory area used as the buffer during printing and the memory area for storing data of font used for character printing, etc. can be provided separately on the network. However, it is of course possible to centralize these memory areas at one information processing unit. That is, it is possible to consider a distributed processing system of the following construction:

(1) Processing for translating the PDL source codes is distributed, but (2) Resources required for software such as printing buffer area, font data, color conversion table required for color printing, etc. are arranged at one location on the network. FIG. 34 is a block diagram showing the one embodiment for realizing the system as described above. Three computers 6a, 6b and 6c and a unit 133 are connected through a network 7. The unit 133 is quite the same as the computers 6a, 6b and 6c in the internal hardware configuration, except that no display unit such as a CRT is provided. The unit 133 is connected to an auxiliary memory unit (hard disk, etc.) 134 through an interface 137 and further to a printing unit 135 through another interface 136. In this embodiment, the printing unit 135 is the electrophotographic type. And unit 133 has a memory unit whose capacitance is sufficient to record all the printing picture elements required for one-page printing. Further, the interface 136 is so constructed as to transfer all the data necessary during one-page printing time duration in a series of electrophotographic printing process. At the current technology, since a high-speed parallel interface (such as SCSI interface) has a transfer speed of about 4 Mbyte/sec, this interface is usable. Further, a high-speed video interface can be also used. Further, font data which describe the outer shapes of various character styles are recorded in the auxiliary memory unit 134, and readable by the other information processing units on the network via the unit 133.

In the above system configuration, software 106 for executing such processing that the PDL source file is translated into printable picture elements is incorporated in the computers 6a, 6b and 6c, respectively. The resident portion of the software 106 is always operative to call the non-resident portion for execution in response to a message transmitted through the network. On the other hand, software 132 is incorporated in the unit 133 in such a way as to behave as a virtual printing unit when seen from the other information processing units on the network. The operation of this embodiment will be explained hereinbelow on assumption that a printing request is generated from any application software operative in the computer 6a.

Procedure 1:
The generated printing request is received by the software 132 via the network.

Procedure 2:
The software 132 receives all the page description codes from the start page to the end page as if the other information processing units would recognize the unit 133 as a printing unit.

Procedure 3:
The software 132 forms the intermediate codes on the basis of the source codes received in Procedure 2, detects dividable graphic form groups on the basis of the intermediate codes, and records the groups in a table by adding an identifier for each group.

Procedure 4:
The software 132 transmits a message for finding out information processing units which can execute the distributed processing via the network 7, to request the process formation.

Procedure 5:
The resident portion of the software 106 respondable to the message secures a memory area, calls a non-resident portion to form the process, and returns the response to the software 132.

Procedure 6:
The software 132 transmits the intermediate codes for describing the previously-divided graphic form groups in accordance with the table formed in Procedure 3 to the task formed in Procedure 5 of the units which respond to the message.

Procedure 7:
The printing picture elements rasterized by the process are transferred to the unit 133 in response to the request of the software 132, and stored and developed in the printing buffer area of the unit 133.

Procedure 8:
After all the printing picture elements necessary for one page have been arranged in the buffer, these picture elements are transferred to the printing unit 135 for actual printing.

In accordance with the above-mentioned procedure, the translation is executed by the PDL distributed processing according to the present invention.

Figure 35:
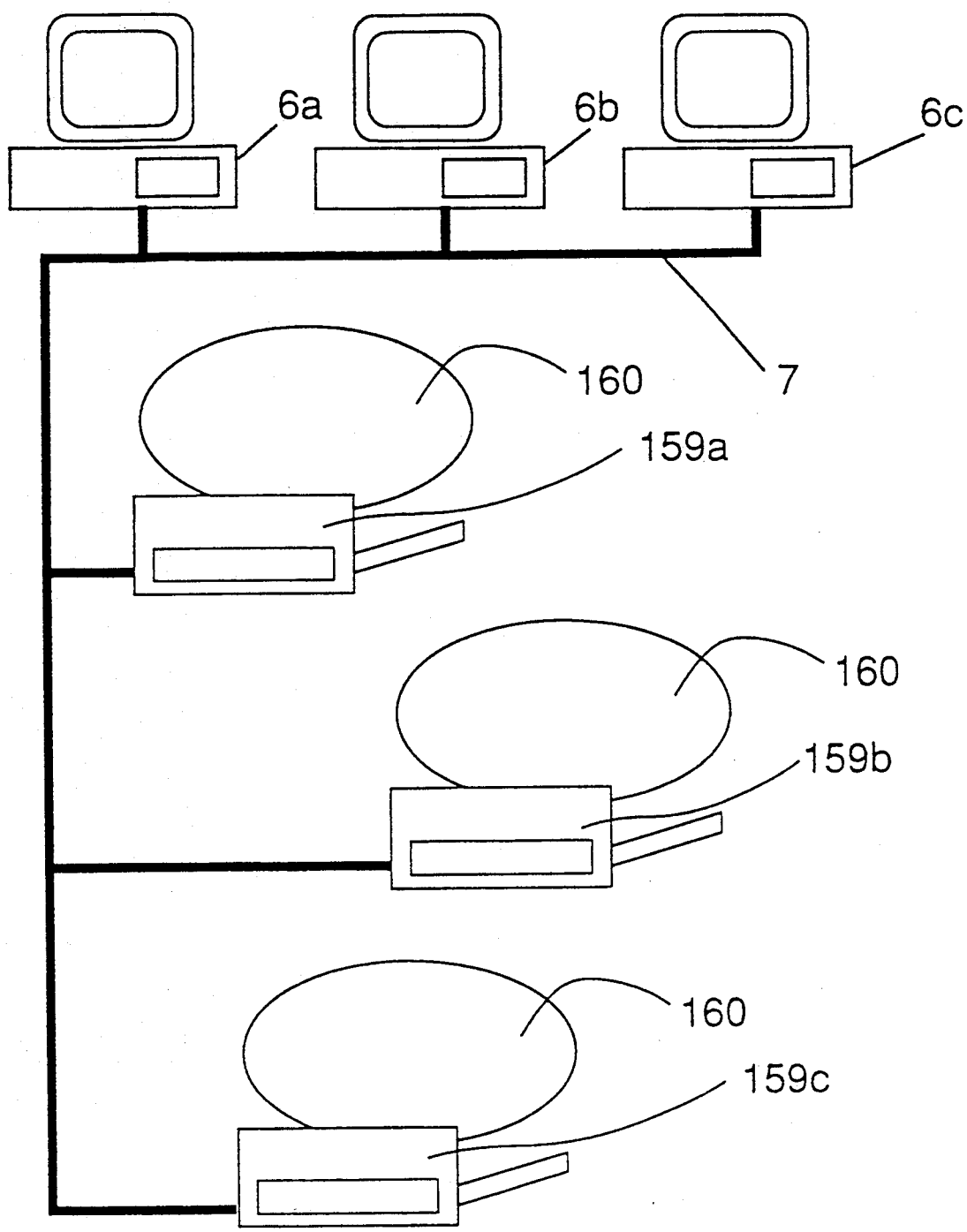
FIG. 35 is a schematic block diagram showing the fourth embodiment configuration according to the present invention.

The fourth embodiment of the present invention will be described hereinbelow with reference to FIG. 35. In this embodiment, a plurality of printing units 159a, 159b and 159c are connected to the network 7 in addition to a plurality of computers 6a, 6b and 6c. The PDL parallel processing interpreter of the present invention is incorporated as software 160 in the printing units 159a, 159b and 159c, respectively. The software 160 is composed of "a resident portion" and "a non-resident portion" in the same way as in the other embodiments so far explained. The resident portion executes the following two: The resident portion receives various request messages generated on the network and calls and executes "the client process" in the non-resident portion if the received message is a printing request therefor; and calls "the server process" in the non-resident portion if the received process is a process formation request from the other distributed processing interpreters. Here, the functions of the client process and the server process are the same as explained in the first embodiment as follows:

The client process:
(1) translates the document description written by the PDL source codes to the stage of the intermediate codes;
(2) detects the dividable graphic form groups;
(3) prepares a graphic form group control table;
(4) starts the server processes;
(5) shares the translating processing with the server processes in accordance with the graphic form group control table; and
(6) receives the picture elements generated by the server processes for executing printing.

On the other hand, the server process:
(1) receives the graphic form groups translated to the intermediate code stage; and
(2) translates the intermediate codes into the picture elements and returns them to the client processes.

If a printing request generated by the application software loaded in any of the computers 6a, 6b and 6c is transmitted for the printing unit 159c, since the printing unit 159c executes the printing in accordance with the distributed processing, the server processes for sharing and executing the PDL translation are required and formed as follows:

Procedure 1:
The translation software 160 loaded in the printing unit 159a forms the client process by use of the memory and the processor resource of this printing unit 159a.

Procedure 2:
The client process formed in Procedure 1 transfers a message to the other information processing units on the network, to inquire whether it is possible to form the task for distributed processing such that the picture elements are generated from the page description language source codes.

Procedure 3:
Only the printing units 159a and 159b in which the software 160 is loaded can respond to the message of Procedure 2 in the system shown in FIG. 35. Therefore, the server process is formed in either or both of these printing units.

Procedure 4:
The distributed processing is executed by use of the server process obtained in Procedure 3.

The more practical respective procedure is the same as with the case of the first to third embodiments.

The fifth embodiment of the present invention will be described hereinbelow with reference to FIG. 36, which is a modification of the fourth embodiment. In FIG. 36, only the printing units 160a, 160b and 160c are interconnected via an exclusive network 162, and connected one to one correspondence to the computers 163a, 163b and 163c via the interfaces 164a, 164b and 164c, respectively. In this embodiment, the interfaces 164a, 164b and 164c are those for transferring data in the unidirection whose specifications conform to, for instance Centronics interfaces. The operation is the same as in FIG. 35; however, there exists such an advantage that the computers and the printing units are connected each other as is conventional.

The sixth embodiment of the present invention will be described hereinbelow.

With the wide use of the printing processing using the PDL, there are a plurality of PDL of different specifications. Therefore, where a number of applications are used, there exists a need of processing a plurality of PDLs of different kinds for printing. Therefore, it is possible to use the already-explained rasterizer in more generalized fashion.

Figure 37:
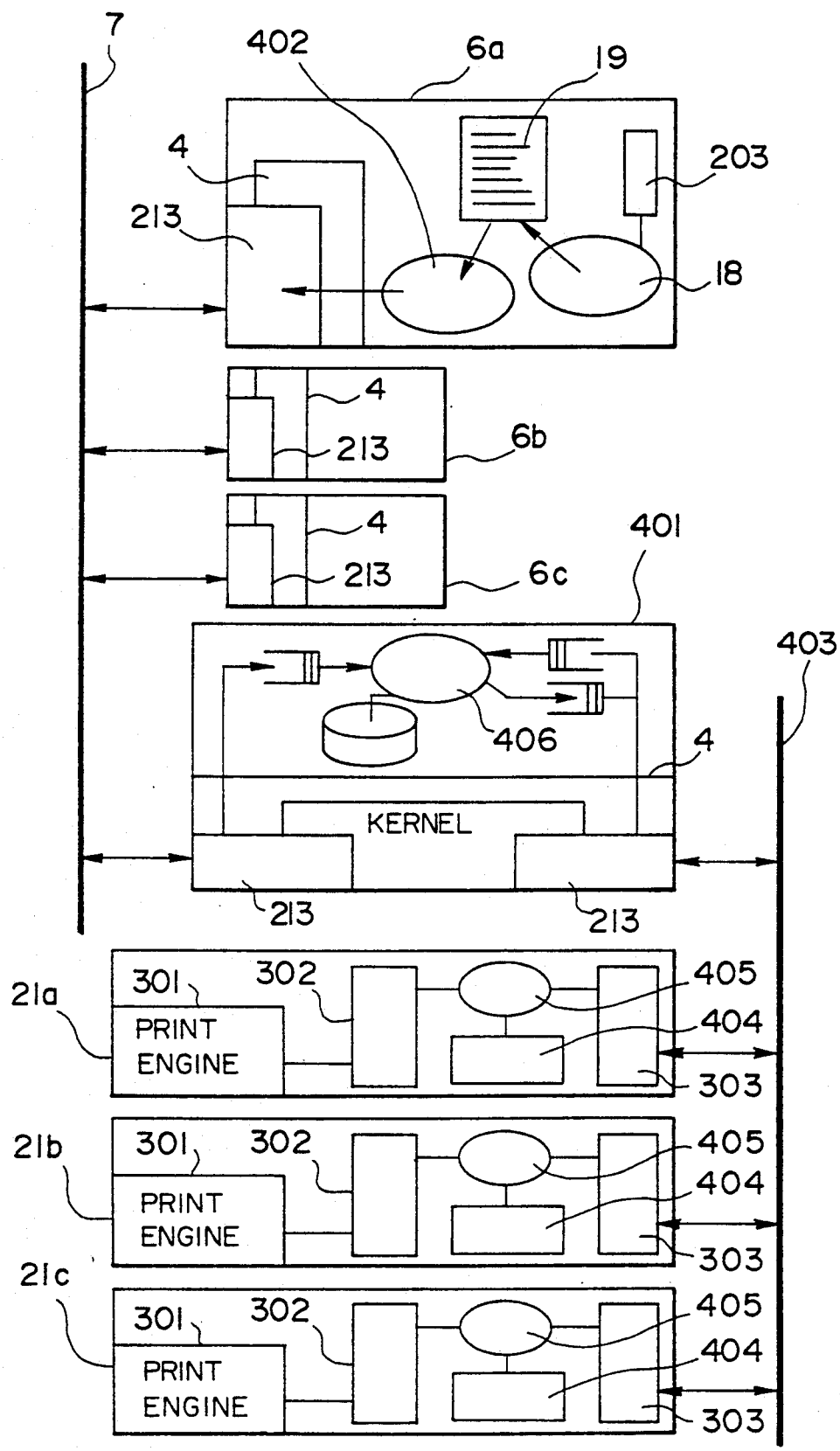
FIG. 37 is a block diagram showing the sixth embodiment configuration according to the present invention.

FIG. 37 is a block diagram showing the sixth embodiment of the present invention, in which three computers 6a, 6b and 6c are connected to a network 7. Further, a print configuration server 401 is connected to the network 7, and a print configuration server 401 and three printing units 21a, 21b and 21c are interconnected each other via a network 403 independent from the network 7.

The processing of this embodiment is as follows: When a user generates a printing request by operating a mouse for instance, the generated request is received by an event processing process 203, and an output file 19 described by the PDL source codes is formed in accordance with a printing processing routine of the application 18 now being used. A print process 402 reads the output file 19 by a file system and transfers it to the print configuration server 401. The processing of the computer 6a ends at this stage, and the other computers 6b and 6c will not execute the distributed processing, being different from the other embodiments. In this embodiment, a process 406 on the print configuration server 401 controls the decentralization of the subsequent processing and the synchronization in parallel execution.

The procedure of the translation printing processing will be explained hereinbelow.

The printing data outputted to the network 7 by the process 402 are data obtained by translating the source file 19 described by the PDL source code into a format required for connection with the print configuration server 401. In this format, an identifier of a printer required to output a print, a paper setting, and an identification of a user who executes the printing processing are added as a header. Since a plurality of printing units are connected to the network 403, the user of the computer 6a which transmits a printing request may require to designate the nearest printing unit. That is, it is necessary that the user can specify any one of the printing units. The process 402 serves to specify a printing unit. The designation of a PDL type to be used and the actual PDL source code string follow the above-mentioned header. The print configuration server 401 receives the above data string to execute the primary translation processing. At this stage, the intermediate codes described in the format mapped on a device coordinate system (i.e. dependent upon the resolution of the printing unit) can be obtained from the PDL source code. Subsequently, these intermediate codes are divided into smaller portions, respectively so as to be executed in parallel processing, as already explained in some embodiments, and transferred to the printing units 21a, 21b and 21c via the network 403. In the printing units 21a, 21b and 21c which receive these intermediate codes, an interface driver 303 takes out each packet of a data string, and gives the packets to an analysis processing process 405.

Figure 38:
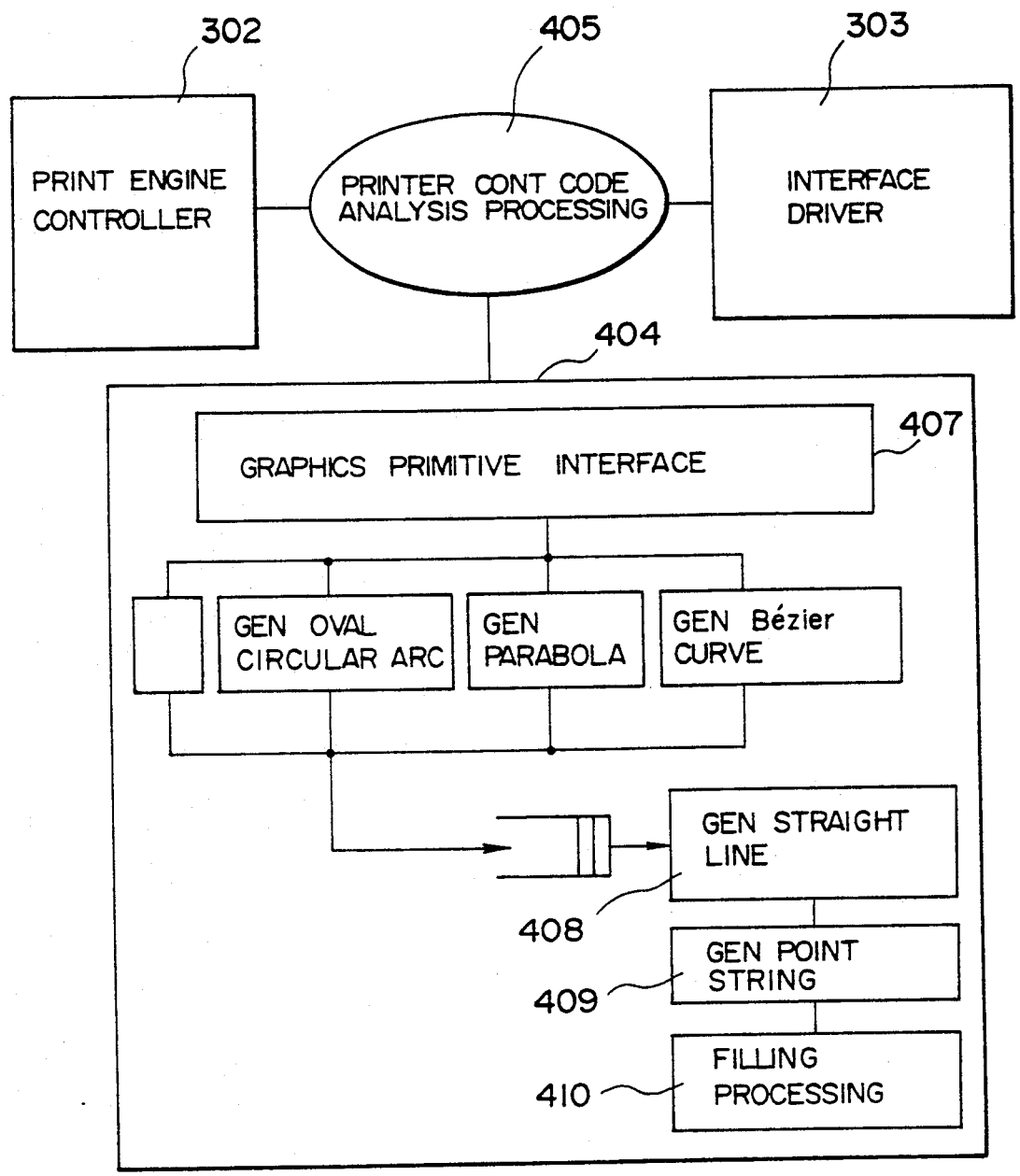
FIG. 38 is a block diagram showing a printer configuration of the sixth embodiment shown in FIG. 37.

FIG. 38 is a block diagram of a processing process group of each printing unit 21a, 21b and 21c. In each printing unit 21a, 21b and 21c, the rasterizer 404 generates the picture elements. In the afore-mentioned embodiments, the rasterizer 212 is configured for a specific page-description language. Being different therefrom, in this embodiment the rasterizer 404 is provided with a graphic primitive interface 407. In the printing unit, the picture elements are quantitized into point strings as the actual picture elements on the image memory. Therefore, the curved line data are actually a series of broken lines composed of minute segments. The major processing of the rasterizer is occupied by a straight line generating processing 408 and a point string generating processing 409.

In the respective printing units 21a, 21b and 21c, the received intermediate codes are converted into a set of straight lines and curved lines independent from the page-description language specifications by the analysis processing process 405. The graphics primitive interface 407 receives these conversion results, executes the broken-line approximation according to each curved line, and transmits the data to the straight line generating processing 408. These data are given to the point string generating processing 409 and further to a filling processing 410 when an area descriptively closed is required to be filled. By the above-mentioned processing, the data taken out of the rasterizer 404 have been converted into picture element data.

With reference to FIG. 37 again, the process 406 of the print configuration server 401 receives data from the rasterizer 404 of each printing unit 21a, 21b and 21c, synthesizes these data on the image memory, and transmits them to a printing unit (e.g. 21a) for executing the printing processing. As described already, the data string transferred from the process 402 to the server 401 includes an identifier indicative of a printing unit required to execute the printing processing. Therefore, a printing unit (e.g. 21a) designated by this identifier executes printing. Accordingly, it is necessary that the printing units 21a, 21b and 21c are provided with a distinguishable network address mechanism, respectively. The network 403 of this embodiment executes the address control for the printing units 21a, 21b and 21c having physical address information, respectively, by matching the network address with the printer identifier. In the same way as in the already-mentioned embodiments, the address is controlled in accordance with the address control table and by the program on the server 401.

As described above, it is possible to realize such a configuration that only the rasterization can be parallel processed on the printer side by introducing the print configuration server 401. In this configuration, since the process 406 on the server 401 translates the page-description language source codes to the graphics primitives, the rasterizers 404 of the printing units 21a, 21b and 21c can be designed independently from the specifications of the page-description language. Further, it is possible to handle page-description languages of plural specifications by the translation of the process 406 on the server.

In the above-mentioned third embodiment, a part of the function executed by the printing unit 108 in the second embodiment is executed by the unit 133. Further, in the second embodiment, a part of the function of the translating system in the first embodiment is shifted to the printing unit side.

As described in the above embodiments according to the present invention, the file described in the PDL is divided and distributed to a plurality of information processing units for translation. In the present invention, the respective portions of the software for realizing the translation can be executed by hardware of any information processing unit. That is, it is not essential to determine the information processing unit for executing the translation. It is understandable by the above-mentioned embodiments that the present invention can be realized by any information processing units, as far as a plurality of information processing units are connected each other via bidirectional communicating means. Further, without being limited to only the above embodiments, it is apparent that various modifications can be made.

Under the general office environment at present, 5 to 20 personal computers are connected to half or more printers. Under these environments, when the operating status of these printers is checked, respectively at any given time, it is seldom that all the printers are simultaneously in operation, and only several printers are usually used for actual printing processing. However, since the printer is provided with a memory unit and a processor, the speed and the capacity thereof increase more and more. In the present invention, since the distributed processing interpreter is mounted on a printer as described above and further a plurality of printers are connected to each other via a network, it is possible not only to markedly improve the performance of each printer, but also to use low-costly printers, because the performance of each printer can be degraded. This is effective from the standpoints of CPU resources and memory resources. Of course, it is also effective to use the distributed processing interpreter according to the present invention on the computers.

In desk-top publishing system using color printers expected to be widely used in the near future, since the memory capacity for color images processing increases markedly in comparison with that for black-and-white images, it is apparent invention is that the present invention is extremely advantageous.

I claim:

1. A page-description language interpreter for executing rasterize processing to obtain printing picture element information from a source file described in a page-description language, comprising:

a plurality of information processing units connected via a network, each of said information processing units having an independent memory which is not shared with another information processing unit of the network for independently processing an assigned task in a parallel-processing system;

means for receiving the source file and dividing a received source file or an intermediate file converted from the received source file into a plurality of partial files each of which can be rasterized independently;

means for transmitting the partial files to said plural information processing units via the network, to distributed-process the rasterize processing by the plural information processing units;

means provided for each of said plural information processing units, for obtaining partial picture element information by rasterizing the transmitted partial file; and means for collecting the partial picture element information obtained by said plural information processing units via the network and forming entire picture element information by combining the collected partial picture element information.

2. The page-description language interpreter of claim 1, wherein said dividing means comprises:
   means for detecting a mutual overlap between graphic form elements included in the source file; and
   means for dividing the source file or the intermediate file into plural partial files in such a way that the detected overlapped graphic form elements are not included in different partial files.

3. The page-description language interpreter of claim 1, wherein said transmitting means comprises means for deciding information processing units which can share the rasterize processing by checking load status of said plural information processing units, respectively, and transmitting the partial files to only the decided information processing units.

4. An information processing unit connectable to at least one other information processing unit via a network, each of said information processing units having an independent memory which is not shared with another information processing unit of the network for independently processing an assigned task in a parallel-processing system, comprising:
   means for receiving a source file described in a page-description language and dividing a received source file or an intermediate file converted from the received source file into a plurality of partial files each of which can be rasterized independently;
   means for transmitting a part of the plural partial files to the other information processing unit via the network, to share partial rasterize processing of the plural partial files with the other information processing unit;
   means for obtaining picture element information of a remaining partial file of the plural partial files, by rasterizing the remaining partial file except the partial file transmitted to the other information processing unit;
   means for receiving a partial picture element information obtained by the rasterize processing in the other information processing unit from the other information processing unit via the network, and obtaining entire picture element information by combining a received partial picture element information with picture element information of the remaining partial file.

5. The information processing unit of claim 4, wherein the information processing unit is a computer.

6. The information processing unit of claim 4, wherein the information processing unit is a printing unit.

7. An information processing unit connectable to a plurality of other information processing units via a network, each of said information processing units having an independent memory which is not shared with another information processing unit of the network for independently processing an assigned task in a parallel-processing system, comprising:
   means for receiving a source file described in a page-description language and dividing a received source file or an intermediate file converted from the received source file into a plurality of partial files each of which can be rasterized independently;
   means for distributing the plural partial files to the plural other information processing units via the network, for rasterize processing of the plural partial files by the plural other information processing units as a distributed process; and
   means for collecting partial picture element information obtained by rasterize processing in the plural other information processing units from the plural other information processing units via the network, and obtaining entire picture element information by combining the collected partial picture element information.

8. An information processing unit connectable to at least one other information processing unit via a network, each of said information processing units having an independent memory which is not shared with another information processing unit of the network for independently processing an assigned task in a parallel-processing system, comprising:
   means for responsive to a message for requesting participation in page-description language translation processing, transmitted from the other information processing unit via the network, for discriminating whether the information processing unit can participate in the translation processing according to load condition, and transmitting a result of said discrimination to the other information processing unit;
   means for receiving a partial file of a source file described in a page-description language or an intermediate code file converted from the source file, transmitted from the other information processing unit via the network, when the information processing unit can participate therein, and obtaining picture element information by rasterizing the partial file; and
   means for transmitting the picture element information obtained by rasterizing the partial file, to the other information processing unit via the network.

9. An interpreter mounted on a first information processing unit connected to at least one other information processing unit via a network, each of said information processing units having an independent memory which is not shared with another information processing unit of the network for independently processing an assigned task in a parallel-processing system, for executing rasterize processing such that a source file described in a page-description language is converted into picture element information used in printing the source file, comprising:
   client means for partially sharing rasterize processing of a first source file whose printing request is generated by the first information processing unit with the other information processing, unit; server means for partially sharing rasterize processing of a second source file whose printing request is generated by the other information processing unit; and rasterize means for executing the rasterize processing of any given file, and
   wherein said client means comprises:
   means for receiving the first source file and dividing the first source file, or a first intermediate code file converted from the first source file, into a plurality of partial files each of which can be rasterized independently;
   means for transmitting a part of the plural partial files to the other unit via the network, to partially share the rasterize processing of the plural partial files with the other unit;

means for transmitting remaining partial files of the plural partial files except those transmitted to the other unit to said rasterize means; and means for receiving picture element information obtained by the rasterize processing of the other unit from the other unit via the network, and obtaining entire picture element information by combining received picture element information with picture element information of a remaining portion obtained by said rasterize means, and wherein said server means comprises:

means for receiving a partial file of the second source file or the second intermediate code file converted from the second source file from the other unit via the network, and transmitting the received partial file to said rasterize means; and means for receiving picture element information of the partial file transmitted to said rasterize means from said rasterize means, and transmitting the received picture element information to the other information processing unit via the network.

10. An interpreting method of executing rasterize processing to obtain printing picture element information from a source file described in a page-description language, comprising the steps of:

preparing a plurality of information processing units connected via a network, each of said information processing units having an independent memory which is not shared with another information processing unit of the network for independently processing an assigned task in a parallel-processing system;

dividing the source file or an intermediate code file converted from the source file into a plurality of partial files each of which can be rasterized independently;

transmitting the partial files to the plural information processing units via the network, to distributed-process the rasterize processing by the plural information processing units;

obtaining partial picture element information by rasterizing the transmitted partial file in each of the plural processing units; and collecting the partial picture element information obtained by the plural information processing units via the network at a place to form entire picture element information by combining the collected partial picture element information.

* * * * *